US008519061B2

(12) United States Patent
Luster-Teasley

(10) Patent No.: US 8,519,061 B2
(45) Date of Patent: Aug. 27, 2013

(54) CONTROLLED RELEASE REMEDIATION SYSTEM AND COMPOSITION

(75) Inventor: Stephanie Luster-Teasley, Greensboro, NC (US)

(73) Assignee: North Carolina A&T State University, Greensboro, NC (US)

( * ) Notice: Subject to any disclaimer, the term of this patent is extended or adjusted under 35 U.S.C. 154(b) by 15 days.

(21) Appl. No.: 12/678,926

(22) PCT Filed: Oct. 15, 2008

(86) PCT No.: PCT/US2008/079979
§ 371 (c)(1),
(2), (4) Date: Nov. 15, 2010

(87) PCT Pub. No.: WO2009/052171
PCT Pub. Date: Apr. 23, 2009

(65) Prior Publication Data
US 2011/0262559 A1 Oct. 27, 2011

(51) Int. Cl.
*C08G 63/91* (2006.01)
(52) U.S. Cl.
USPC ........... 525/415; 210/757; 210/758; 210/764; 525/56
(58) Field of Classification Search
USPC .................. 210/757, 758, 764; 525/56, 415
See application file for complete search history.

(56) References Cited

U.S. PATENT DOCUMENTS

| | | | |
|---|---|---|---|
| 5,275,943 | A | 1/1994 | DiTuro |
| 5,348,803 | A | 9/1994 | Schlameus et al. |
| 6,386,796 | B1 | 5/2002 | Hull |
| 6,502,633 | B2 | 1/2003 | Cooper et al. |
| 6,838,504 | B1 | 1/2005 | Webster et al. |
| 7,056,061 | B2 | 6/2006 | Kukor et al. |
| 7,431,849 | B1 * | 10/2008 | Swearingen et al. ......... 210/749 |
| 2005/0058512 | A1 | 3/2005 | Looney et al. |

FOREIGN PATENT DOCUMENTS

WO 2009042228 A1 4/2009

OTHER PUBLICATIONS

Akelah, A. "Novel utilizations of conventional agrochemicals by controlled release formulations," copyright 1996, Materials Science and Engineering C, 4(2), pp. 83-98.
Al-Zahrani, S.M., "Utilization of polyethylene and paraffin waxes as controlled delivery systems for different fertilizers," copyright 2000, Industrial Engineering Chemistry Research, 39(2), pp. 367-371.
Ambient Water Quality Criteria for Bacteria: EPA-44015-84-002; copyright 1986, USEPA, Cincinnati, Ohio.
Anipsitakis, G.P., Tufano, T.P., and Dionysiou, D.D., "Chemical and microbial decontamination of pool water using activated potassium peroxymonosulfate," copyright 2008, Water Research, vol. 42, pp. 2899-2910.
Baxter-Potter, W.R. and Gilliland, M.W., "Bacterial Pollution in Runoff from Agricultural Lands," copyright 1988, Journal of Environmental Quality, vol. 17, pp. 27-34.
Blowes, D.W., Ptacek, C.J., Benner, S.G., McRae, C.W.T., Bennett, T.A., Puls, R.W., "Treatment of inorganic contaminants using permeable reactive barriers," copyright 2000, Journal of Contaminant Hydrology, 45(1), pp. 123-137.
Burkholder, J., Libra, B., Weyer, R, Heathcote, S., Kolpin, D., Thorne, P.S., and Wichman, M., "Impacts of waste from concentrated animal feeding operations on water quality," copyright 2007, Environmental Health Perspectives, vol. 115, pp. 308-312.
Burt, T.A., Li, Z., Bowman, R.S., "Evaluation of granular surfactant-modified/zeolite zero valent iron pellets as a reactive material for perchloroethylene reduction," copyright 2005, Journal of Environmental Engineering, 131(6), pp. 934-942.
Cole, D., Todd, L., and Wing, S., "Concentrated swine feeding operations and public health: A review of occupational and community health effects," copyright 2000, Environmental Health Perspectives, vol. 108, pp. 685-699.
Ding, J., Liu, G. "Water-soluble hollow nanospheres as potential drug carriers," copyright 1998, Journal of Physics and Chemistry B, 102(31), pp. 6107-6113.
Eleraky, N. Z., Potgieter, L.N. D., and Kennedy, M.A., "Virucidal efficacy of four new disinfectants," copyright 2002, Journal of the American Animal Hospital Association, vol. 38, pp. 231-234.
Gates-Anderson, D.D., Siegrist, R.L., and Cline, S.R., "Comparison of potassium permanganate and hydrogen peroxide as chemical oxidants for organically contaminated soils," copyright 2001, Journal of Environmental Engineering, 127(4), pp. 337-347.
Gerba, C. and Smith, J., "Sources of Pathogenic Microorganisms and Their Fate during Land Application of Wastes," copyright 2005, Journal of Environmental Quality, pp. 42-48.
Gessel, P.D., Hansen, N.C., Goyal, S.M., Johnston, L.J., and Webb, J. "Persistance of zoonotic pathogens in surface soil treated with different rates of liquid pig manure," copyright 2004, Applied Soil Ecology, 25(3), pp. 237-243.
Hernandez, A.D., Bunnell, J.F., and Sukhdeo, M.V.K., "Composition and diversity patterns in metazoan parasite communities and anthropogenic disturbance in stream ecosystems," copyright 2007, Parasitology, vol. 134, pp. 91-102.
Huang, K.C., Hoag, G.E., Chheda, P., Woody, B.A., Dobbs, G.M., "Chemical oxidation of trichloroethylene with potassium permanganate in a porous medium," copyright 2002, Advances in Environmental Research, 7(1), pp. 217-229.

(Continued)

*Primary Examiner* — Robert Jones, Jr.
(74) *Attorney, Agent, or Firm* — Clara R. Cottrell; Kimberly B. Gatling; Smith Moore Leatherwood LLP

(57) ABSTRACT

A controlled release remediation composition or compositions, a method making such composition(s), a method of using such composition(s), and a remediation system including such composition(s) are disclosed. The disclosed controlled release remediation composition or compositions include at least one chemical oxidant agent, optionally, at least two chemical oxidant agents; at least one encapsulant polymer; and, optionally, at least one matrix polymer. The disclosed controlled release remediation composition or compositions are capable of substantially constantly releasing an amount of the at least one chemical oxidant agent, optionally, amounts of the at least two chemical oxidant agents, for example, into an aqueous system such as may be found at a contaminated site, over at least about a one month period up to over about a three month period.

23 Claims, 22 Drawing Sheets

(56) References Cited

OTHER PUBLICATIONS

Kakoulides, E.P., Valkanas, G.N., "Modified rosin-paraffin wax resings as controlled delivery systems for fertilizers. Fabrication parameters governing fertilizer release in water," copyright 1994, Industrial Engineering Chemistry Research, 33(6), pp. 1623-1630.

Kang, N., Hua, I., Rao, P.S., "Production and characterization of encapsulated potassium permanganate for sustained release as an in-situ oxidant," copyright 2004, Industrial Engineering Chemistry Research, 43(17), pp. 5187-5193.

Kennedy, R.J., and Stock, A.M., "The Oxidation of Organic Substances by Potassium Peroxymonosulfate," copyright 1960, Journal of Organic Chemistry, vol. 25, pp. 1901-1906.

Kohn, J. "Overview of the use of polymers in medical application as illustrated by the design, characterization, and application of tyrosine-derived polymers," copyright 1996, Technical Papers, Regional Technical Conference—Society of Plastics Engineers; Brookfield, CT, USA. Soc of Plastics Engineers, pp. 103-110. (Technical Papers, Regional Technical Conference—Society of Plastics Engineers).

Lee et al., "Characteristics and applications of controlled—release KMnO4 for groundwater remediation," copyright 2007, Chemosphere 66, pp. 2058-2066.

Lenz, R.W., Marchessault, R. "Bacterial polyesters: biosynthesis, biodegradable plastics and biotechnology," copyright 2005, Biomacromolecules, 6(1), pp. 1-8.

Luster-Teasley, Great Britain Patent Application No. GB1007465.6 filed Jul. 7, 2010, Examination Report from Great Britain Patent Office dated Feb. 28, 2012.

Luster-Teasley, S.L., Onochie, P., "Development of Slow-release Chemical Oxidation Methods for Environmental Remediation," copyright 2009, World Environmental and Water Resources Congress 2009: Great Rivers.

Luster-Teasley, S.L., Onochie, P., Shirley, V., "Chapter 2: Encapsulation of Potassium Permanganate Oxidant in Biodegradable Polymers to develop a novel form of Controlled-Release Remediation," copyright 2010, Innovative Environmental Engineering Technologies, Elsevier, Editor: V Shah, pp. 39-55.

Mogul, M.G., Akin, H., Harirci, N., Trantolo, D.J., Gresser, J.D., Wise, D.L., "Controlled Release of biologically active agents for the purposes of agricultural crop management," copyright 1996, Resources, Conservation and Recycling, 16, pp. 289-320.

Paul, M., Atluri, S. Setlow, B., and Setlow, P., "Mechanisms of killing of spores of *Bacillus subtilis* by dimethyldioxirane," copyright 2006, Journal of Applied Microbiology, vol. 101, pp. 1161-1168.

Payne, J.B., Kroger, E.C., and Watkins, S.E., "Evaluation of disinfectant efficacy when applied to the floor of poultry grow-out facilities," copyright 2005, Journal of Applied Poultry Research, vol. 14, pp. 322-329.

Quaglia, F., Barbato, F., De Rosa, G., Granata, E., Miro, A., La Rotonda, M.I. "Reduction of the environmental impact of pesticides: waxy microspheres encapsulating the insecticide carbaryl," copyright 2001, Journal of Agricultural Food Chemistry, 49(10), pp. 4808-4812.

Rogers, S. and Haines, J., "EPA Report: Detecting and Mitigating the Environmental Impact of Fecal Pathogens Originating from Confined Animal Feeding Operations: Review," copyright Sep. 2005, United States Environmental Protection Agency (USEPA), EPA/600/R-06-021.

Ross, C., Murdoch, L.C., Freedman, D.L., Siegrist, R.L., "Characteristics of potassium permanganate encapsulated in polymer," copyright 2005, Journal of Environmental Engineering, 131(8), pp. 1203-1211.

Schnarr, M., Truax, C., Farquhar, G., Hood, E., Gonullu, T., Stickney, B. "Laboratory and controlled field experiments using potassium permagnanate to remediate trichloroethylene and perchloroethylene DNAPLs in porous media," copyright 1998, Journal of Contaminant Hydrology, 29, pp. 205-224.

Schwartz, "Semi-Passive Chemical Oxidation Schemes for the Long-term Treatment of Contaminants," copyright 2005, Report to the Department of Energy.

Shaviv, A., Raban, S., Zaidel, E. "Modeling controlled nutrient release from polymer coated fertilizers: diffusion release from singe granules," copyright 2003, Environmental Science and Technology, 37(10), pp. 2251-2256.

Siegrist, R., Lowe, K.S., Murdoch, L.C., Case, T.L., Pickering, D.A. "In-situ oxidation by fracture emplaced reactive solids," copyright 1999, Journal of Environmental Engineering, 125(5), pp. 429-440.

Solazzo, C., Erhardt, D., Marte, F., Von Endt, D., and Tumosa, C., "Effects of chemical and biological warfare remediation agents on the materials of museum objects," copyright 2004, Applied Physics a-Materials Science & Processing, vol. 79, pp. 247-252.

Test Methods for *Escherichia coli* and Enterococci in Water by the Membrane Filter Procedure, copyright 2002, EPA-600/4-85-076; USEPA, Cincinnati, Ohio.

"The Use of Indicator Organisms to Assess Public Water Safety," copyright 2000, Technical Information Series—Booklet No. 13.

Uhrich, K. "Polymeric systems for controlled drug release," copyright 1999, Chemical Reviews, 99(11), pp. 3181-3198.

Vert, M. "Aliphatic polyesters: great degradable polymers that cannot do everything," copyright 2005, Biomacromolecules, 6(2), pp. 538-546.

"Wastewater and Biosolids Analysis Manual Digestion and Selected Methods for Determining Metals, Minerals, and Other Related Parameters," copyright 1999, Hach Company.

Wing, S., Freedman, S., and Band, L., "The potential impact of flooding on confined animal feeding operations in eastern North Carolina," copyright 2002, Environmental Health Perspectives, vol. 110, pp. 387-391.

Ziemer, CJ., Bonner, J. M., Vinjé, D. C. J., Constantini, V., Goyal, S., Gramer, M., Mackie, R., Meng, X. J., Myers, G., and Saif, L. J., "Fate and transport of zoonotic, bacterial, viral, and parasitic pathogens during swine manure treatment, storage, and land application," copyright 2010, Journal of Animal Science, pp. E84-E94.

International Search Report mailed on Jun. 5, 2009 in PCT/US2008/079979.

Written Opinion mailed on Jun. 5, 2009 in PCT/US2008/079979.

Luster-Teasley, Great Britain Patent Application No. GB1007465.6; Sep. 28, 2012 Examination Report from the Intellectual Property Office of Great Britain.

Examination Report mailed on Dec. 24, 2012 in Great Britain Application No. GB1007465.6.

Examination Report mailed on Feb. 4, 2013 in Great Britain Application No. GB1007465.6.

Lee E.S., Schwartz, F.W.; Characterization and optimization of long-term controlled release system for groundwater remediation: A generalized modeling approach. Chemosphere 69 (2007) pp. 247-253.

Examination Report mailed on Mar. 22, 2012 in Great Britain Application No. GB1007465.6.

\* cited by examiner

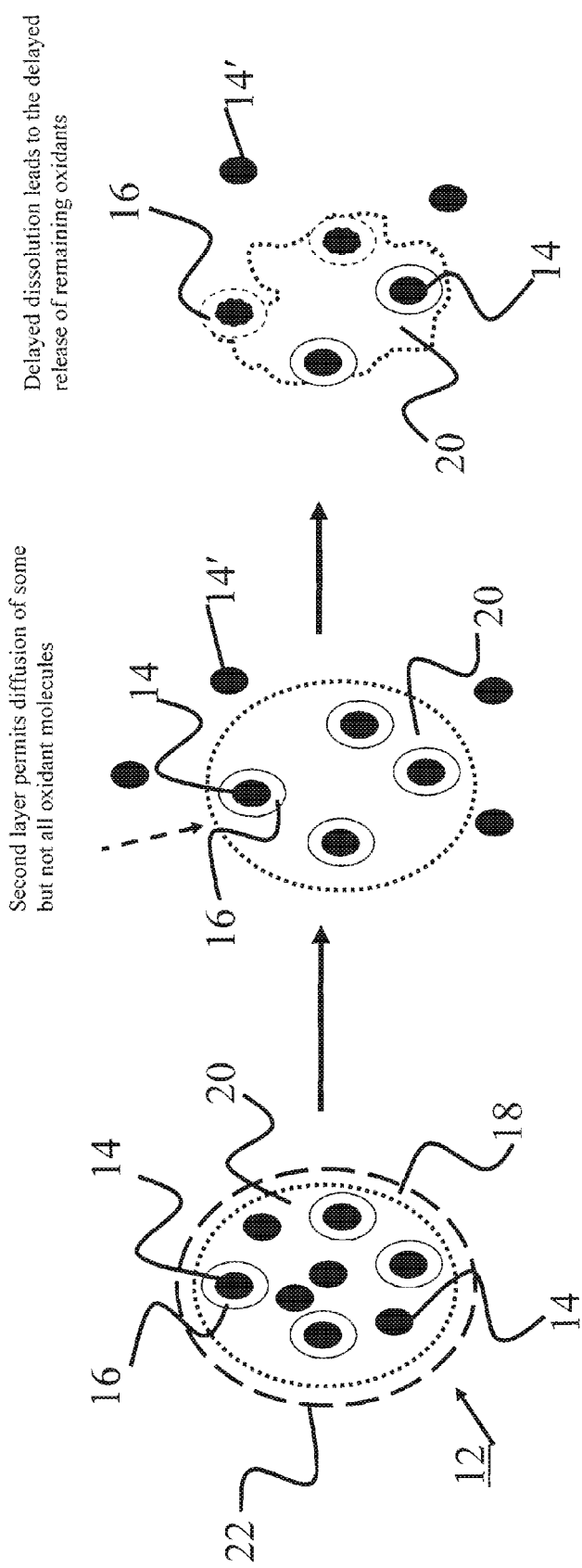

CONTROLLED RELEASE REMEDIATION SYSTEM AND COMPOSITION

PRIORITY APPLICATION

This application is a national stage application under 35 U.S.C. §371 of international application No. PCT/US2008/079979 filed 15 Oct. 2008, and claims priority to U.S. application Ser. No. 11/873,961 filed 17 Oct. 2007, the disclosures of which are expressly incorporated herein by reference.

FIELD OF THE INVENTION

The present invention relates to a controlled release remediation system including at least one controlled release remediation composition. Also, the present invention relates to a method for manufacturing a controlled release remediation composition usable in a controlled release remediation system. Further, the present invention relates to a method for remediating a contaminated site using a controlled release remediation composition.

BACKGROUND

The United States has more than 200,000 sites with contaminated groundwater and subsurface soils due to leaking underground storage tanks, industrial wastes, and accidental spills. These contaminated sites contain over 1.7 million gallons of chemical and foreign microbial waste; the ability to conduct subsurface remediation is essential for controlling and reducing potential spread of contaminants within an aquifer's watershed.

Subsurface remediation proves to be challenging because most sites require treatment of both groundwater and subsurface soils. Conventional methods for in-situ remediation include pump-and-treat, thermal desorption, use of surfactants, and air venting. Each method has benefits and limitations, but all of these methods require a long time, many months to years, before significant remediation is accomplished at a contaminated site.

Chemical oxidants are highly reactive gases and liquids that can be injected into the ground to remediate both groundwater and soils in-situ. Current oxidant delivery methods are effective in remediating recalcitrant compounds; however, these methods are costly, require high maintenance, and can be dangerous to workers. Examples of chemical oxidation hazards include contact with strong oxidizing solutions and acids, explosions, and worker injuries due to the use of more risky techniques such as direct-push injections for liquid delivery.

Thus there remains a need for a new and improved remediation system and a controlled release remediation composition or compositions that address the problems of conventional methods for in-situ remediation.

SUMMARY

The present invention meets these and other needs by providing a controlled release remediation composition or compositions, a method making such composition(s), a method of using such composition(s), and a remediation system including such composition(s). According to various aspects of embodiments of the present invention, a controlled release remediation composition or compositions include at least one chemical oxidant agent, optionally, at least two chemical oxidant agents; at least one encapsulant polymer; and, optionally, at least one matrix polymer. To that end according to various aspects of embodiments, a controlled release remediation composition or compositions are capable of substantially constantly releasing an amount of the at least one chemical oxidant agent, optionally, amounts of the at least two chemical oxidant agents, for example, into an aqueous system such as may be found at a contaminated site, over at least about a one month period up to over about a three month period.

Numerous other features and advantages of aspects of embodiments and embodiments of the invention will appear from the following description. In the description, reference is made to exemplary aspects of embodiments and embodiments of the invention. Such aspects of embodiments and embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to shall be considered to support claims to any of the following ranges: 1-5; 1-4; 1-3; 1-2; 2-5; 2-4; 2-3; 3-5; 3-4; and 4-5.

In one example of an aspect of an embodiment, a controlled release remediation composition comprises at least one pellet. As will be appreciate by those in the art, such pellet might comprise one or more variety of shapes and/or sizes, for example, to control a rate of release and/or a concentration of oxidant that is released. Some examples of one or more variety of shapes of pellets include spheres, cylinders, "wagon wheels", gear-shapes, saddles, disks, bricks, coils, columns, hollow-elbows, chips, fibers, or shapes of any two or more of the preceding. Also, some examples of one or more variety of sizes of pellets might include one of more dimensions ranging from about a micron (µm) to multiple tens of millimeters (mm). In aspects of an embodiment, sizes can comprise in one aspect a largest dimension of about 1 millimeter (mm, about −18 mesh); in another aspect, between about 500 microns (µm) and about 1.0 µm (about −35, +1000 mesh), and, in yet another aspect, between about 300 microns (µm) and about 1.0 µm (about −50, +635 mesh).

Examples of an at least one chemical oxidant agent includes at least one of a photo-oxidants agent, an electron transfer reaction agent, a free radical agent, or combinations of any two or more of the preceding. Other examples of an at least one chemical oxidant agent include at least one of a persulfate agent, a permanganate agent, or combinations of any two or more of the preceding. Such examples can include at least one of a titanium oxide agent, a molybdenum sulfide agent, zinc sulfide agent, a sodium permanganate agent, a potassium permanganate agent, a sodium persulfate agent (e.g., synonyms: peroxydisulfuric acid, disodium salt; disodium sulfonatooxy sulfate; sodium peroxydisulfate; disodium peroxydisulfate), an ammonium persulfate agent (e.g., synonyms: peroxydisulfuric acid, diammonium salt; diammonium sulfonatooxy sulfate; ammonium peroxydisulfate; diammonium peroxydisulfate), a potassium persulfate agent (e.g., synonyms: peroxydisulfuric acid, dipotassium salt; dipotassium sulfonatooxy sulfate; potassium peroxydisulfate; dipotassium peroxydisulfate), or a combination of any two or more of the preceding. Again, it will be appreciated that more that at least one chemical oxidant agent can be used, for example, at least two or even plurality. It will be appreciated that an at least one chemical oxidant agent can come in a variety of shapes and/or sizes. Such shapes can be a particle size comprising not greater than about 125 µm (−120 mesh), optionally between about 75 microns (µm) and about 1.0 µm (About −200, +1000 mesh), and optionally between about 50 microns (µm) and about 1.0 µm (about −270, +1000 mesh).

When a controlled release remediation composition includes a matrix polymer in combination with an encapsulant polymer, the matrix polymer can be selected to have a degradation rate less than the release rate of the at least one chemical oxidant agent and greater than the encapsulant degradation rate the at least one encapsulant polymer. Also, a controlled release remediation composition can further include at least one additional encapsulant polymer that encapsulates at least a portion of the matrix polymer embedding at least a portion of the encapsulated chemical oxidant agent.

When a controlled release remediation composition includes at least one matrix polymer in combination with at least one encapsulant polymer, the at least one chemical oxidant agent can be between about 1 wt % to about 60 wt % of the controlled release remediation composition; the at least one encapsulant polymer can be between about 1 wt % to about 99 wt % of the controlled release remediation composition; and the at least one matrix polymer can be the balance of the controlled release remediation composition.

Some examples of broad classifications of environmentally degradable polymer and/or the biodegradable polymer groups include poly(esters), poly(ortho-esters), poly(anhydrides), poly(amides), poly(saccharides) a blend of any two or more of the preceding, or a copolymer of any two or more of the preceding. Some further examples of environmentally degradable polymer and/or the biodegradable polymer include at least one of a polylactide, a polyglycolide, a polylactide-co-glycolide, a polylactic acid, a polyglycolic acid, a polylactic acid-co-glycolic acid, a polycaprolactone, a polycarbonate, a polyesteramide, a polyvinyl ester, a polyanhydride, a polyamino acid, a polyorthoester, a polyacetyls, a polycyanoacrylates, a polyetheresters, a polydioxanone, a polyalkylen alkylate, a copolymer of a polyethylene glycol and a polylactid or polylactide-co-glycolide, a biodegradable polyurethane, a polysaccharide, a blend of any two or more of the preceding, or a copolymer of any two or more of the preceding. Blends of such polymers can include, for example, between 0 wt % to about 100 wt % of a first polymer; between 0 wt % to about 60 wt % of a second polymer; and a balance of a third polymer. Alternatively, copolymers of such polymers can include, for example, between 0 wt % to about 100 wt % of a first polymer; between 0 wt % to about 60 wt % of a second polymer; and a balance of a third polymer.

Among examples of environmentally degradable polymer and/or the biodegradable polymer, polylactic acid, polyvinyl alcohol, polycaprolactone, a blend of any two or more of the preceding, or a copolymer of any two or more of the preceding have been found to work satisfactorily. Blends of such polymers can include, for example, between 0 wt % to about 60 wt % of a polylactic acid; between 0 wt % to about 60 wt % of a polyvinyl alcohol; and between 0 wt % to about 100 wt % of a polycaprolactone. In an aspect of an embodiment concerning polycaprolactone blends, an amount of polycaprolactone is not less than about 40 wt % of the blend. Alternatively, copolymers of such polymers can include, for example, between 0 wt % to about 60 wt % of a polylactic acid; between about 0 wt % to about 60 wt % of a polyvinyl alcohol; and between 0 wt % to about 100 wt % of a polycaprolactone. In an aspect of an embodiment concerning polycaprolactone copolymers, an amount of polycaprolactone is not less than about 40 wt % of the copolymers.

Some examples of chemical pollutants include at least one of a chlorinated organic compound (e.g., polychlorinated biphenyls (PCBs), chlorinated benzenes (CBs)), a compound containing at least one unsaturated carbon-carbon bond, an aromatic hydrocarbon (AH: e.g., benzene, toluene, ethylbenzene, xylene, [note that BTEX is an acronym that stands for Benzene, Toluene, Ethylbenzene, and Xylene], mesitylene, phenol, . . . etc.), a polycyclic aromatic hydrocarbon (PAH: e.g., anthracene, chrysene, naphthalene, phenanthrene, benzo[a]pyrene, pyrene, benz[a]anthracene, benzo[b]fluoranthene, benzo[j]fluoranthene, benzo[k]fluoranthene, benzo[ghi]perylene, coronene, dibenz[a,h]anthracene ($C_{20}H_{14}$), indeno[1,2,3-cd]pyrene ($C_{22}H_{12}$), ovalene, . . . etc.), methyl tertiary-butyl ether (also known as MTBE), a munitions constituent (e.g., cyclotrimethylenetrinitramine, also known as RDX, cyclonite, hexogen, and T4; trinitrotoluene, also known as TNT; cyclotetramethylene-tetranitramine, also known as HMX, and octogen; . . . etc.), organic pesticides, wastewater, a drinking water treatment, a pathogen (e.g., bacteria, viruses, protozoa, fungi, proteins, . . . etc.) or any combination of two or more of the preceding. Some further examples of pathogens include biological agents sometimes referred to as biological pathogens, in general, or terrorist biological pathogens such as *E. coli, Bacillus atrophaeus, Bacillus thuringiensis*, and *Aspergillus niger* (i.e., anthrax, plague, . . . etc.).

Accordingly, one aspect of an embodiment the present invention is to provide a controlled release remediation composition that includes at least one chemical oxidant agent, at least one encapsulant polymer, and at least one matrix polymer. The at least one chemical oxidant agent is selected to be capable of remediating at least one chemical pollutant. Also, the at least encapsulant polymer is selected to be substantially compatible with at least one chemical oxidant agent. At least a portion of the encapsulant polymer encapsulates at least a portion of the chemical oxidant agent. Also, at least a portion of the encapsulant polymer includes at least one of an environmentally degradable polymer, a biodegradable polymer, or an environmentally degradable polymer and biodegradable polymer. As to the matrix polymer, at least a portion of it embeds at least a portion of the encapsulated chemical oxidant agent. As with the encapsulant polymer, at least a portion of the matrix polymer includes at least one of an environmentally degradable polymer, a biodegradable polymer, or an environmentally degradable polymer and biodegradable polymer. In this manner, the controlled release remediation composition is capable of substantially constantly releasing an amount of the at least one agent chemical oxidant agent, for example, into an aqueous system such as may be found at a contaminated site, over at least about a one month period up to over about a three month period.

Another aspect of an embodiment the present invention is to provide a controlled release remediation composition comprising a plurality of chemical oxidant agents and a polymer. At least two of the plurality chemical oxidant agents are capable of remediating at least two different chemical pollutants. At least a portion of the polymer encapsulates at least a portion of the plurality of chemical oxidant agents. Also, at least a portion of the polymer comprises a biodegradable polymer. The controlled release remediation composition is capable of substantially constantly releasing an amount of the at least two of the plurality chemical oxidant agents into an aqueous system over at least a one month period up to over about a three month period.

Yet another aspect of an embodiment the present invention is to provide a method of making controlled release remediation composition. Steps of the method can include one or more selecting and combining steps. For example, at least one chemical oxidant agent capable of remediating at least one chemical pollutant is selected. As another example, at least one encapsulant polymer that is substantially compatible with the at least one chemical oxidant agent is selected. Such at least one encapsulant polymer includes at least one of an environmentally degradable polymer, a biodegradable polymer, or an environmentally degradable polymer and biodegradable polymer. As yet another example, at least one matrix polymer is selected. As with the at least one encapsulant polymer, such at least one matrix polymer includes at least one of an environmentally degradable polymer, a biodegradable polymer, or an environmentally degradable polymer and biodegradable polymer. The at least one encapsulant polymer and the at least one matrix polymer may be the same, different, or include components that are related, such as, by a starting monomer or monomers. As to one example of combining steps, at least a portion of the chemical oxidant agent is encapsulated using the encapsulant polymer. As to another example of combining steps, the encapsulated chemical oxidant agent is combined with the at least one matrix polymer so that at least a portion of the matrix polymer embeds at least a portion of the encapsulated chemical oxidant agent.

Still another aspect of an embodiment of the present invention is to provide a remediation system including at least one controlled release remediation composition that includes at least one chemical oxidant agent, at least one encapsulant polymer, and at least one matrix polymer. The at least one chemical oxidant agent is selected to be capable of remediating at least one chemical pollutant. Also, the at least one encapsulant polymer is selected to be substantially compatible with at least one chemical oxidant agent. At least a portion of the encapsulant polymer encapsulates at least a portion of the chemical oxidant agent. Also, at least a portion of the encapsulant polymer includes at least one of an environmentally degradable polymer, a biodegradable polymer, or an environmentally degradable polymer and biodegradable polymer. As to the matrix polymer, at least a portion of it embeds at least a portion of the encapsulated chemical oxidant agent. As with the encapsulant polymer, at least a portion of the matrix polymer includes at least one of an environmentally degradable polymer, a biodegradable polymer, or an environmentally degradable polymer and biodegradable polymer. In this manner, the remediation product is capable of substantially constantly releasing a sufficient amount of the at least one agent chemical oxidant agent into a contaminated site over at least about a one month period up to over about a three month period so as to remediate at least a portion of the at least one chemical pollutant.

Still yet another aspect of an embodiment the present invention is to provide a method of using a controlled release remediation composition. Steps of the method can include one or more determining, selecting, combining, and providing steps. For example, at least one chemical pollutant to be remediated at a contaminated site is identified. Then, at least one chemical oxidant agent capable of remediating the at least one chemical pollutant is selected. Another selecting example includes selecting at least one encapsulant polymer that is substantially compatible with the at least one chemical oxidant agent is selected. Such at least one encapsulant polymer includes at least one of an environmentally degradable polymer, a biodegradable polymer, or an environmentally degradable polymer and biodegradable polymer. As yet another example, at least one matrix polymer is selected. As with the at least one encapsulant polymer, such at least one matrix polymer includes at least one of an environmentally degradable polymer, a biodegradable polymer, or an environmentally degradable polymer and biodegradable polymer. The at least one encapsulant polymer and the at least one matrix polymer may be the same, different, or include components that are related, such as, by a starting monomer or monomers. As to one example of combining steps, at least a portion of the chemical oxidant agent is encapsulated using the encapsulant polymer. As to another example of combining steps, the encapsulated chemical oxidant agent is combined with the at least one matrix polymer so that at least a portion of the matrix polymer embeds at least a portion of the encapsulated chemical oxidant agent to form a controlled release remediation composition. Further steps involve shaping, sizing, and/or providing. For example, the controlled release remediation composition is shaped, sized, or shaped and sized so as to be capable of substantially constantly releasing an amount of the at least one chemical oxidant agent, for example, into an aqueous system of a contamination site, over at least about a one month period up to over about a three month period. As to an example of providing, a sufficient amount of the shaped, sized, or shaped and sized controlled release remediation composition is provided to the contaminated site in manner that remediates at least a portion of the at least one chemical pollutant at the contaminated site.

These and other aspects, advantages, and salient features of the present invention will become apparent from the following detailed description, the accompanying drawings, and the appended claims.

BRIEF DESCRIPTION OF DRAWINGS

FIG. 3 is a schematic illustrating a controlled release remediation composition constructed according to yet another aspect of an embodiment of the present invention;

FIG. 8 is a plot comparing degradation in river water and culture water of pellets made using a PAB-100 and a PAB-60 polymer blend for;

DETAILED DESCRIPTION

In the following description, like-referenced characters designate like or corresponding parts throughout the several views shown in the figures. It is also understood that terms such as "top," "bottom," "outward," "inward," and the like are words of convenience and are not to be construed as limiting terms.

Figure 1:
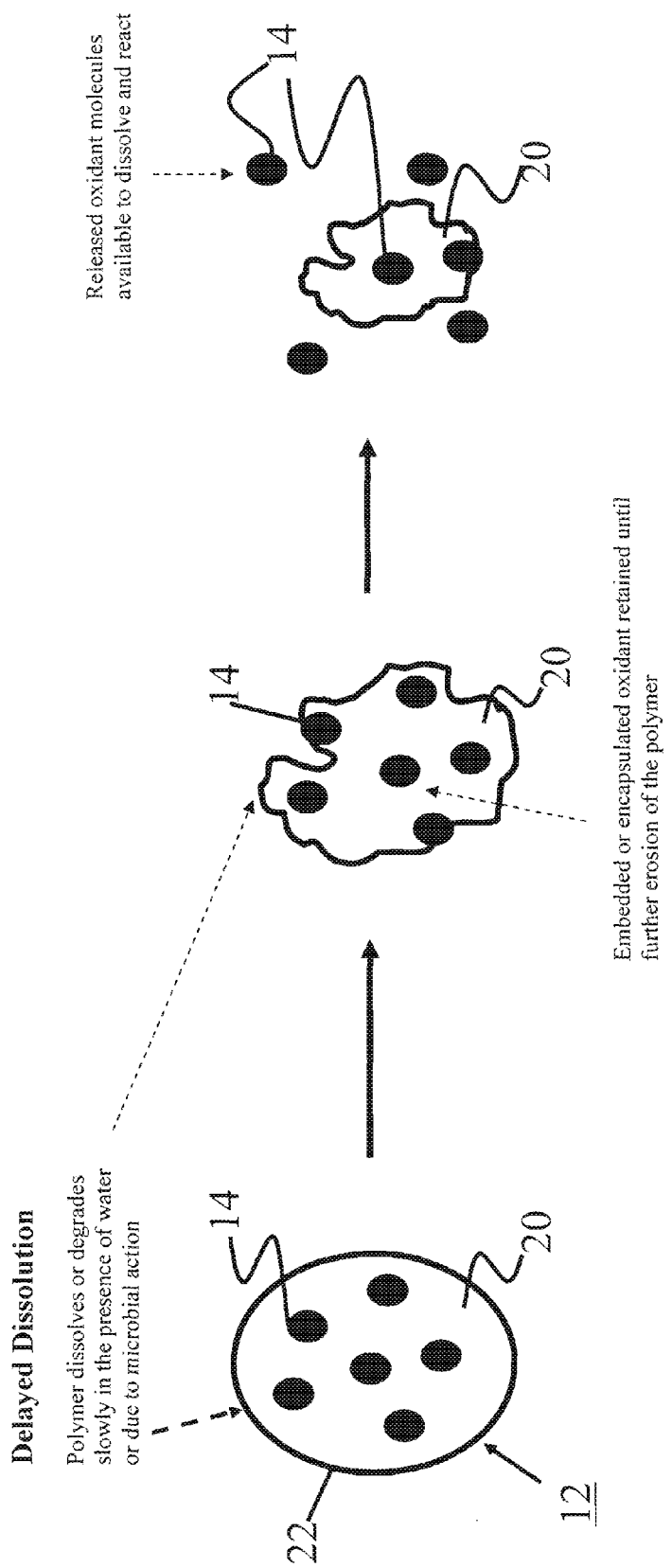
FIG. 1 is a schematic illustrating a controlled release remediation composition constructed according to an aspect of an embodiment of the present invention.
Figure 2:
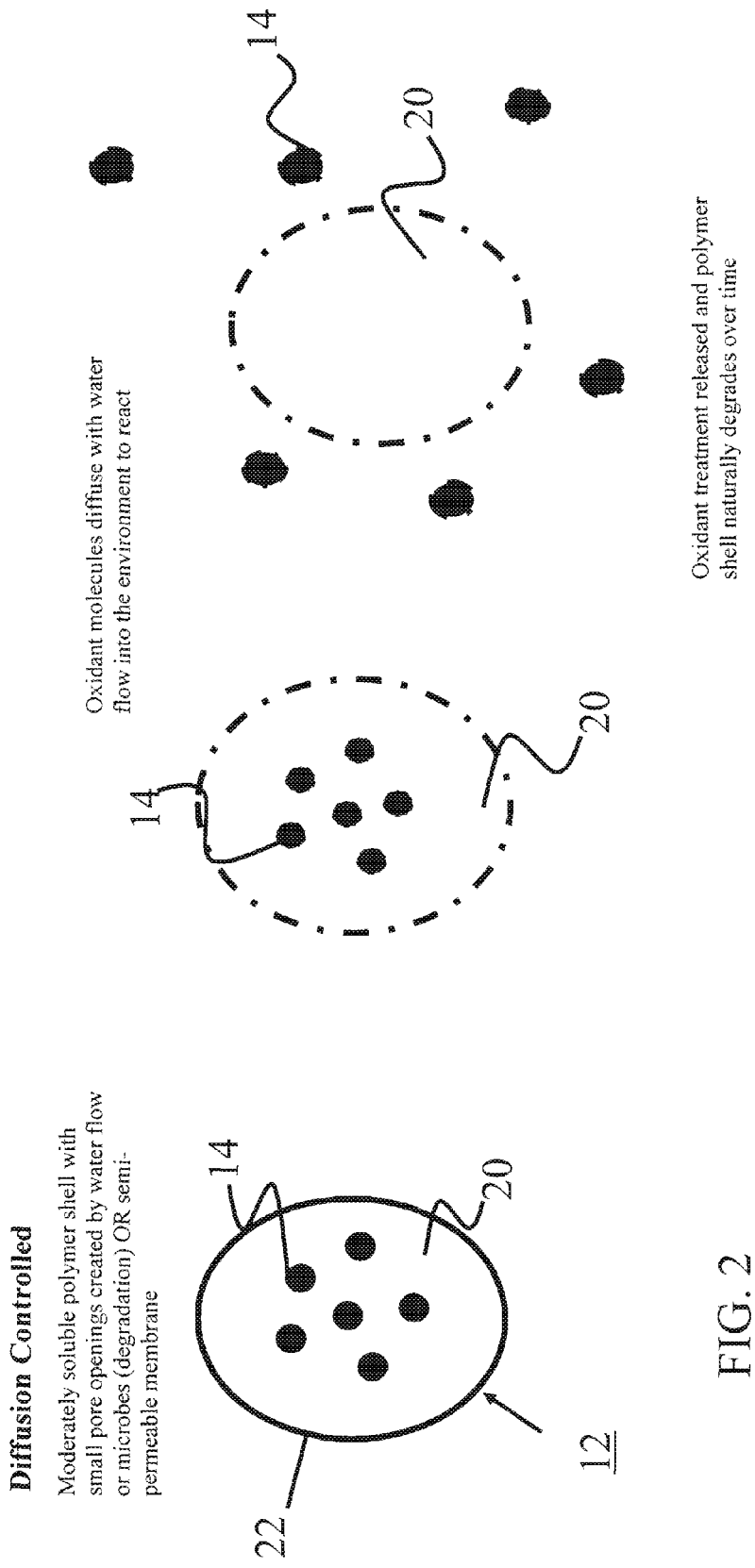
FIG. 2 is a schematic illustrating a controlled release remediation composition constructed according to another aspect of an embodiment of the present invention.

Referring to the drawings in general and to FIGS. 1, 2, and 3 in particular, it will be understood that the illustrations are for the purpose of describing one or more aspects of and/or one or more embodiments of the invention and are not intended to limit the invention thereto. In FIGS. 1, 2, and 3, a controlled release remediation composition is generally designated 12. Such composition 12 includes at least one chemical oxidant agent 14 and at least one matrix polymer 20. Such composition 12 can include at least one encapsulant polymer 16. The at least one chemical oxidant agent 14 is selected to be capable of remediating at least one chemical pollutant 22 (not depicted in FIGS. 1, 2, and 3). A matrix polymer 20 is selected to be substantially compatible with at least one chemical oxidant agent 14 and at least a portion of it embeds at least a portion of the chemical oxidant agent 14. At least a portion of the matrix polymer 20 includes at least one of an environmentally degradable polymer, a biodegradable polymer, or an environmentally degradable polymer and biodegradable polymer. In this manner, the controlled release remediation composition 12 can be capable of substantially constantly releasing an amount of the at least one agent chemical oxidant agent 14, for example, into an aqueous system such as may be found at a contaminated site, over at least about a one month period up to over about a three month period. Also, the at least one encapsulant polymer 16 is selected to be substantially compatible with at least one chemical oxidant agent 14.

In some aspects of embodiments of the present invention as shown in FIG. 3, at least a portion of an encapsulant polymer 16 encapsulates at least a portion of a chemical oxidant agent 14. Such encapsulant polymer 16 can include at least one of an environmentally degradable polymer, a biodegradable polymer, or an environmentally degradable polymer and biodegradable polymer. Is such case, at least a portion of a matrix polymer 20 embeds at least a portion of the encapsulated chemical oxidant agent 14'. As with the matrix polymer 20, at least a portion of the encapsulant polymer 16 includes at least one of an environmentally degradable polymer, a biodegradable polymer, or an environmentally degradable polymer and biodegradable polymer. In this manner, the controlled release remediation composition is capable of substantially constantly releasing an amount of the at least one agent chemical oxidant agent, for example, into an aqueous system such as may be found at a contaminated site, over at least about a one month period up to over about a three month period.

"Degradable" or "degradation" is intended to mean that the polymer undergoes an irreversible process that leads to a significant change in the chemical and/or physical structure of the material that is typically characterized by a loss of physical and/or chemical properties, such as integrity, molecular weight, molecular structure, mechanical strength, and/or fragmentation. In an aspect, a polymer degrades to a benign non-toxic material that is not harmful to the environment.

A degradation of a polymer can be by a process that involves one or more of, for example, photodegradation, chemical degradation, physical degradation or, biodegradation. Photodegradation includes a process of degradation that can be initiated by exposure of the polymer to natural or artificial light. Chemical degradation includes a process of degradation wherein chemical bonds in the polymer are broken as a result of one or more chemical reactions such as, for example, hydrolysis, thermal cleavage, or oxidation. Chemical degradation is thus more encompassing than photodegradation, since the reactions are not limited to those initiated by exposure to light. Physical degradation can include forces such as erosion that may help a polymer to degrade. Biodegradation includes a process of degradation that occurs as a result of the action of enzymes, derived from the metabolic processes of microorganisms or other living species, on the polymer. It is possible that a given mechanism of degradation may be classified as more than one of the above-described processes.

"Biodegradable" means that a polymer or polymer component is susceptible to being assimilated by microorganisms when buried in the ground or otherwise contacted with the organisms under conditions conducive to their growth.

"Environmentally degradable" means that a polymer or polymer component is capable of being degraded by surrounding environmental elements (e.g., chemical, physical, thermal, and/or light) without microorganisms to a form that ultimately may be biodegradable when it mineralizes, for example, biodegrades to carbon dioxide, water and biomass.

Conditions that enable the chemical, physical, thermal and/or biological degradation of a polymer or polymer component may vary. A polymer or polymer component of this invention are especially adapted to be degradable in soil and/or subterranean applications.

It will be appreciated that in aspects of embodiments of the present invention, a controlled release remediation composition 12 might be used in an alone process or in conjunction with another engineered system as a remediation system 10. For example, a controlled release remediation composition 12 might comprise at least one pellet 22, a plurality of which is capable of being packed into a screened well or mix into the soil to form a permeable barrier layer at a contamination site. Such a barrier layer of controlled release remediation composition 12 would be capable of releasing one or more chemical oxidant agents 14 as groundwater flows through it to react with contaminated water and chemical pollutants 24 present in the soil and/or subterranean level.

As noted, a controlled release remediation composition 12 might comprise at least one pellet 22. As will be appreciate by those in the art, such pellet might comprise one or more variety of shapes and/or sizes, for example, to control a rate of release and/or a concentration of oxidant that is released. Some examples of one or more variety of shapes of pellets include spheres, cylinders, "wagon wheels", gear-shapes, saddles, disks, bricks, coils, columns, hollow-elbows, chips, fibers, or shapes of any two or more of the preceding. Also, some examples of one or more variety of sizes of pellets might include one of more dimensions ranging from about a micron (μm) to multiple tens of millimeters (mm). In one aspect of an embodiment, sizes can comprise in one aspect a largest dimension of about 1 millimeter (mm, about −18 mesh); in another aspect, between about 500 microns (μm) and about 1.0 μm (about −35, +1000 mesh), and, in yet another aspect, between about 300 microns (μm) and about 1.0 μm (about −50, +635 mesh).

Examples of an at least one chemical oxidant agent 14 includes at least one of a photo-oxidants agent, an electron transfer reaction agent, a free radical agent, or combinations of any two or more of the preceding. Other examples of an at least one chemical oxidant agent include at least one of a persulfate agent, a permanganate agent, or combinations of any two or more of the preceding. Such examples can include at least one of a titanium oxide agent, a molybdenum sulfide agent, a zinc sulfide agent, a sodium permanganate agent, a potassium permanganate agent, a sodium persulfate agent (e.g., synonyms: peroxydisulfuric acid, disodium salt; disodium sulfonatooxy sulfate; sodium peroxydisulfate; disodium peroxydisulfate), an ammonium persulfate agent (e.g., synonyms: peroxydisulfuric acid, diammonium salt; diammonium sulfonatooxy sulfate; ammonium peroxydisulfate; diammonium peroxydisulfate), a potassium persulfate agent (e.g., synonyms: peroxydisulfuric acid, dipotassium salt; dipotassium sulfonatooxy sulfate; potassium peroxydisulfate; dipotassium peroxydisulfate), or a combination of any two or more of the preceding. Again, it will be appreciated that more that at least one chemical oxidant agent 14 can be used, for example, at least two (e.g., a first chemical oxidant agent 14 and a second chemical oxidant agent 14') or even plurality (e.g., chemical oxidant agent 14, a second chemical oxidant agent 14', . . . a $n^{th}$ chemical agent 14n). It will be appreciate that an at least one chemical oxidant agent can come in a variety of shapes and/or sizes. Such shapes can be a particle size comprising not greater than about 125 μm (−120 mesh), optionally between about 75 microns (μm) and about 1.0 μm (About −200, +1000 mesh), and optionally between about 50 microns (μm) and about 1.0 μm (about −270, +1000 mesh).

When a controlled release remediation composition 12 includes a matrix polymer 20 in combination with an encapsulant polymer 16, the matrix polymer 20 can be selected to have a degradation rate less than the release rate of the at least one chemical oxidant agent 14 and greater than the degradation rate of the at least one encapsulant polymer 16. Also, a controlled release remediation composition 12 can further include at least one additional encapsulant polymer 18 that encapsulates at least a portion of the matrix polymer 20 embedding at least a portion of the encapsulated chemical oxidant agent 14.

When a controlled release remediation composition 12 includes at least one matrix polymer 20 in combination with at least one encapsulant polymer 16, the at least one chemical oxidant agent 14 can be between about 1 wt % to about 60 wt % of the controlled release remediation composition 12; the at least one encapsulant polymer 16 can be between about 1 wt % to about 99 wt % of the controlled release remediation composition 12; and the at least one matrix polymer 20 can be the balance of the controlled release remediation composition 12.

Some examples of environmentally degradable polymer and/or the biodegradable polymer include at least one of a polylactide, a polyglycolide, a polylactide-co-glycolide, a polylactic acid, polyglycolic acid, polylactic acid-co-glycolic acid, a polycaprolactone, a polycarbonate, a polyesteramide, a polyvinyl ester, a polyanhydride, a polyamino acid, a polyorthoester, a polyacetyls, a polycyanoacrylates, polyetheresters, a polydioxanone, a polyalkylen alkylate, a copolymer of a polyethylene glycol and a polylactid or polylactide-co-glycolide, a biodegradable polyurethane, a polysaccharide, a blend of any two or more of the preceding, or a copolymer of any two or more of the preceding. Blends of such polymers can include, for example, between 0 wt % to about 100 wt % of a first polymer; between 0 wt % to about 60 wt % of a second polymer; and a balance of a third polymer. Alternatively copolymers of such polymers can include, for example, between 0 wt % to about 100 wt % of a first polymer; between 0 wt % to about 60 wt % of a second polymer; and a balance of a third polymer.

Among examples of environmentally degradable polymer and/or the biodegradable polymer, polylactic acid, polyvinyl alcohol, polycaprolactone, a blend of any two or more of the preceding, or a copolymer of any two or more of the preceding have been found to work satisfactorily. Blends of such polymers can include, for example, between 0 wt % to about 60 wt % of a polylactic acid; between 0 wt % to about 60 wt % of a polyvinyl alcohol; and between 0 to about 100 wt % of a polycaprolactone. Alternatively copolymers of such polymers can include, for example, between 0 wt % to about 100 wt % of a polylactic acid; between 0 wt % to about 60 wt % of a polyvinyl alcohol; and between 0 wt % to about 100 wt % of a polycaprolactone.

Some examples of chemical pollutants 24 include at least one of a chlorinated organic compound (e.g., polychlorinated biphenyls (PCBs), chlorinated benzenes (CBs)), a compound containing at least one unsaturated carbon-carbon bond, an aromatic hydrocarbon (AH: e.g., benzene, toluene, ethylbenzene, xylene, [note that BTEX is an acronym that stands for Benzene, Toluene, Ethylbenzene, and Xylene], mesitylene, phenol, . . . etc.), a polycyclic aromatic hydrocarbon (PAH: e.g., anthracene, chrysene, naphthalene, phenanthrene, benzo[a]pyrene, pyrene, benz[a]anthracene, benzo[b]fluoranthene, benzo[j]fluoranthene, benzo[k]fluoranthene, benzo[ghi]perylene, coronene, dibenz[a,h]anthracene ($C_{20}H_{14}$), indeno[1,2,3-cd]pyrene ($C_{22}H_{12}$), ovalene, . . . etc.), methyl tertiary-butyl ether (also known as MTBE), a munitions constituent (e.g., cyclotrimethylenetrinitramine, also known as RDX, cyclonite, hexogen, and T4; trinitrotoluene, also known as TNT; cyclotetramethylene-tetranitramine, also known as HMX, and octogen; . . . etc.), organic pesticides, wastewater, a drinking water treatment, a pathogen (e.g., bacteria, viruses, protozoa, fungi, proteins, . . . etc.), or any two or more of the preceding. Some further examples of pathogens include biological agents sometimes referred to as biological pathogens, in general, or terrorist biological pathogens such as *E. coli, Bacillus atrophaeus, Bacillus thuringiensis*, and *Aspergillus niger* (i.e., anthrax, plague, . . . etc.).

In an operation according an aspect of an embodiment relating to delayed dissolution as shown to FIG. 1, polymer matrix 20 environmentally degrades (e.g., dissolves in the presence of water or degrades slowly in the presence of water)

and/or biologically degrades (e.g., due to microbial action). Some embedded and/or encapsulated chemical oxidant agent 14 is retained until further degradation of the polymer. Released chemical oxidant agent 14 is available to dissolve and react with one or more chemical pollutants 24.

In an operation according an aspect of an embodiment relating to diffusion controlled as shown to FIG. 2, polymer matrix 20 environmentally degrades (e.g., moderately water soluble with small pore openings created by water flow) and/or biologically degrades (e.g., due to microbial action). Chemical oxidant agent 14 diffuses with water flow into the environment to react one or more chemical pollutants 24. FIG. 2 explains diffusion controlled release of the encapsulated oxidant. For example, the polymer matrix 20 may be moderately soluble and/or have small pore openings created due to the semi-permeable property for the polymer, water flow or microbial degradation. This enables a chemical oxidant agent 14 to diffuse across a shell boundary.

In an operation according an aspect of an embodiment relating to delayed dissolution in combination with diffusion controlled as shown to FIG. 3, additional encapsulant polymer 18 environmentally degrades (e.g., moderately water soluble with small pore openings created by water flow) and/or biologically degrades (e.g., due to microbial action). Polymer matrix 20 permits diffusion of some but not all of chemical oxidant agent 14'. Delayed dissolution leads to the delayed release of remaining chemical oxidant agent 14 that eventually diffuses with water flow into the environment to react with one or more chemical pollutants 24.

Examples Including Permanganate

Certified ACS $KMnO_4$ (Fisher Chemical, Fair Lawn, N.J.) was used as the oxidant encapsulated in an environmentally degradable polymer, a biodegradable polymer, an environmentally degradable polymer and biodegradable polymer, a copolymer thereof, or a blend thereof. Poly-lactic acid (NatureWorks LLC, Minnetonka, Minn.), polyvinyl alcohol (Aldrich Chemical, Milwaukee, Wis.), and polycaprolactone (Dow Chemical, Midland Mich.) were evaluated.

To produce controlled release remediation compositions, pure polymers and polymer blends were combined to produce about 0.3 to about 0.5 cm solid pellets. Molten polymer was created by heating a polymer above its melting point in an aluminum dish or Pyrex® beaker using a hot plate stirrer. $KMnO_4$ was stirred into the molten polymer to suspend $KMnO_4$. Pellets were then formed by placing the viscous molten suspension in a mold to solidify and form the pellets.

Those skilled in the art will appreciate that other methods might be used to make a controlled release remediation composition according to aspects of embodiments and/or embodiments of the present invention. For example, an extrusion process might be used to incorporate one or more chemical oxidant agents with matrix polymer with the elongate extrudant being chopped to form pellets. Other methods might include fiber spinning, injection molding, mixing and compounding, pultrusion, and reaction injection molding.

Criteria for an environmentally degradable polymer or a biodegradable polymer selection includes a compatibility with a selected chemical oxidant agent, in the examples $KMnO_4$, an ability to form solid pellet structures. In an aspect of an embodiment of the invention, a largest dimension of a pellet might comprises about 1 millimeter (mm, about −18 mesh), optionally between about 500 microns (μm) and about 1.0 μm (about −35, +1000 mesh), and optionally between about 300 microns (μm) and about 1.0 μm (about −50, +635 mesh), and an ability of such polymer to degrade or dissolve to release the chemical oxidant agent.

Applicant contemplates controlled release remediation compositions that exhibited delayed dissolution delivery, diffusion controlled delivery, or combined delayed/diffusion delivery of a chemical oxidant agent, in the examples $KMnO_4$. In a controlled release remediation composition exhibiting delayed diffusion, a polymer either dissolves in water or degrades due to microbial action to release chemical oxidant agent, in the examples $KMnO_4$. In a controlled release remediation composition exhibiting diffusion control, a chemical oxidant agent, in the examples $KMnO_4$, is able to diffuse through the matrix polymer into water. FIGS. 1, 2, and 3 depict designs to enable the controlled release of oxidants from a biodegradable polymer.

Evaluated polymers included polylactic acid (PLA), polyvinyl alcohol (PVOH), and polycaprolactone (PCL). Polylactic acid (PLA), an aliphatic polyester, is a hydrophobic, biodegradable polymer that can be degraded by aerobic or anaerobic. Polylactic acid has a thermal melting point at about 193° C., therefore the melting point for the polymer is less than the melting point of potassium permanganate (270° C.). Polyvinyl alcohol (PVOH) is a hydrophilic polymer selected for use as a polymer blend and has a melting temperature of about 200° C. Applicant believes that PVOH could be used in blends to provide a method to increase the diffusion of $KMnO_4$ into water. Polycaprolactone (PCL) is a biodegradable polymer having a melting temperature of about 60° C. and is degradable under aerobic and anaerobic conditions.

Figure 4B:
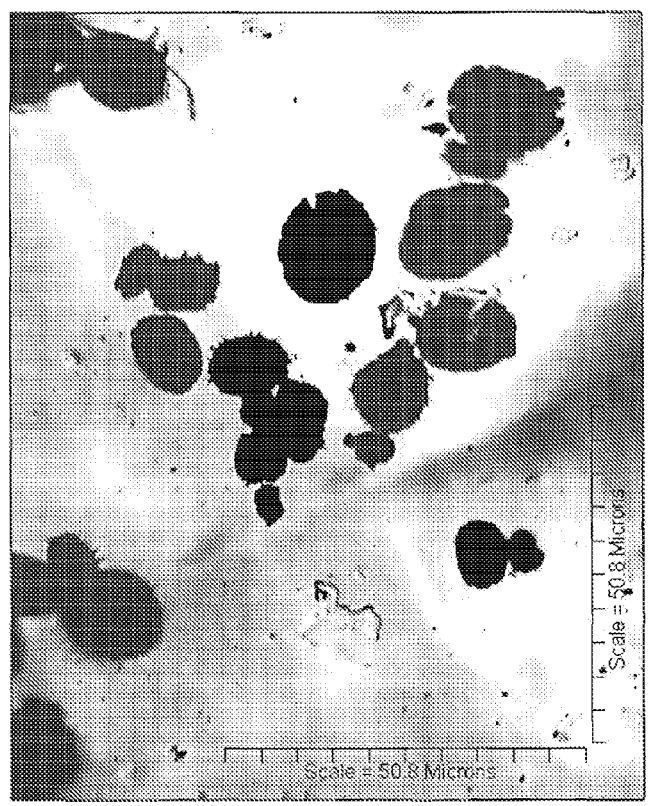
FIGS. 4a and 4b are photos of the $KMnO_4$ in a PLA polymer photographed (FIG. 4a) after it was made into a controlled release remediation composition and (FIG. 4b) a controlled release remediation composition approximately seven months later.
Figure 4A:
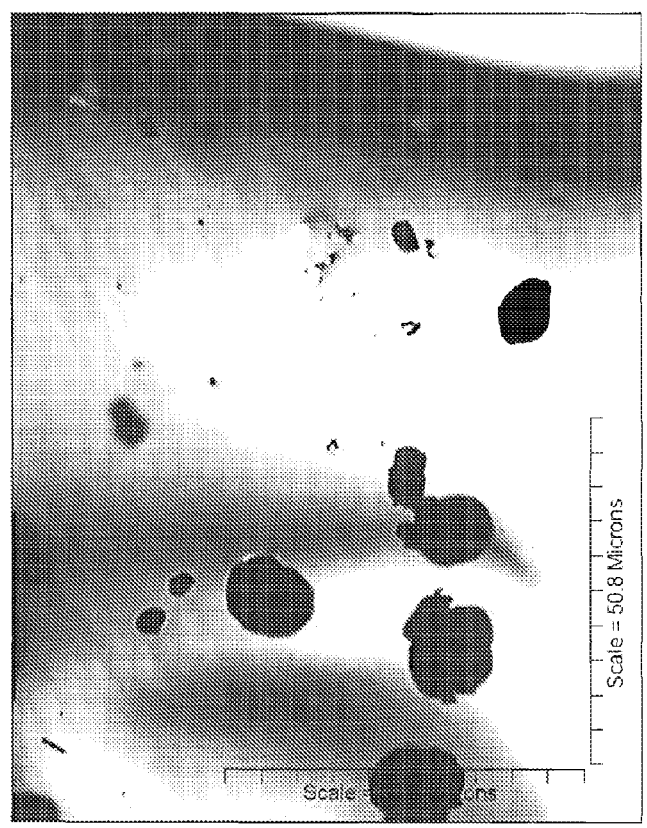
Figure 5B:
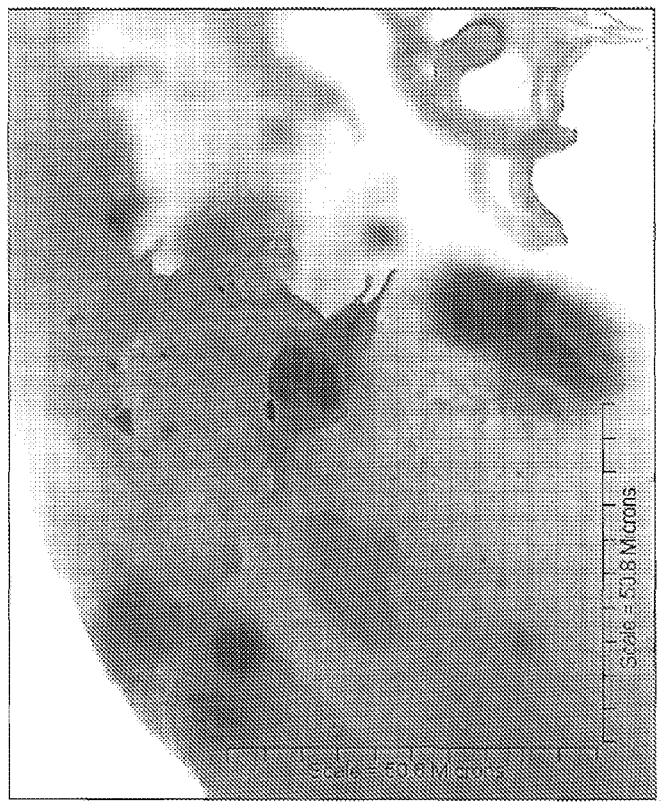
FIGS. 5a and 5b are photos of the $KMnO_4$ in a polycaprolactone (PCL) polymer photographed (FIG. 5a) after it was made into a controlled release remediation composition and (FIG. 5b) a controlled release remediation composition approximately seven months later.
Figure 5A:
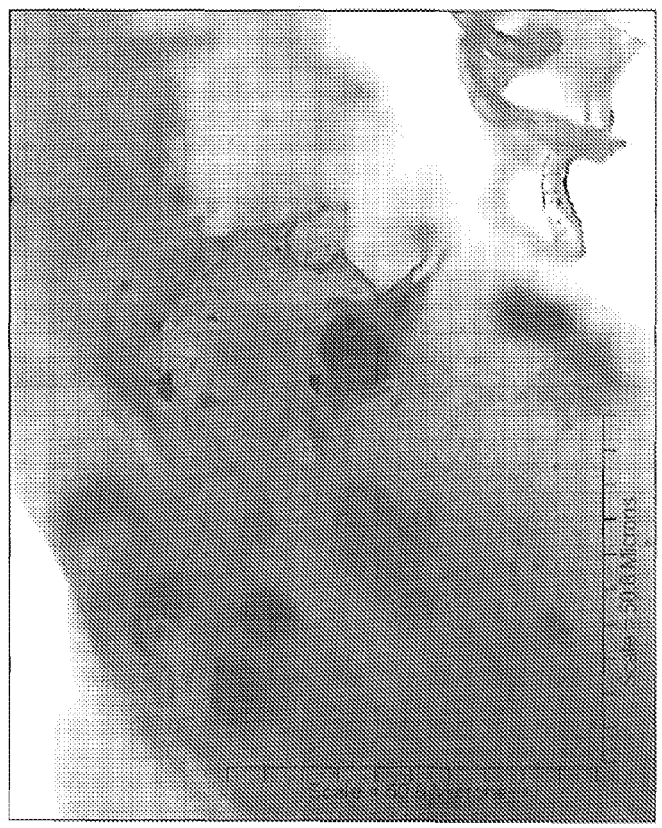

Polylactic acid, polyvinyl alcohol, and polycaprolactone were tested for reactivity with $KMnO_4$. One concern for encapsulant polymer and/or matrix polymer is that a chemical oxidant agent is adversely affected by an interaction or reaction. For example, if the $KMnO_4$ is reactive with polymer, visible evidence would be a brown discoloration caused by $MnO_2$ from $KMnO_4$ degradation or visible degradation of the polymer. For this test, $KMnO_4$ was encapsulated using PLA, PVOH blends, and PCL matrices to form pellets and mounted on a glass slide. Photos at 40× and 100× were taken of the pellets using a digital microscope to observe any reactions or discoloration of the matrix. Little to no reactivity was seen in PLA, PVOH blends, and PCL matrices. FIGS. 4(*a*) and 4(*b*) show that $KMnO_4$ appears to be stable and non-reactive when in contact with PLA. FIG. 4*a* is a photo of the $KMnO_4$ in the PLA polymer photographed after it was made and FIG. 4*b* shows the same sample photographed approximately seven month later. FIGS. 4*a* and 4*b* show that $KMnO_4$ appears to be stable and non-reactive when in contact with PLA. FIG. 5*a* is a photo of the $KMnO_4$ in the PCL polymer photographed after it was made and FIG. 5*b* shows the same sample photographed approximately seven months later. FIGS. 5*a* and 5*b* show that $KMnO_4$ appears to be stable and non-reactive when in contact with PCL.

Six controlled release remediation compositions met the criteria (e.g., (1) polymer compatibility with the chemical oxidant agent, (2) the ability for diffusion of the chemical oxidant agent through the polymer, and (3) the ability to form pellet structures using the polymer that is feasible for use as fill material for a permeable reactive barrier or in a reactor system). Identification numbers were assigned to the polymer and polymer blends, namely, PAB-50, PAB-60, PAB-70, PAB-80, PAB-90, and PAB-100 were PAB stand for a blend of polycarprolactone (PCL) and polyvinyl alcohol (PVOH) and −X stand for the amount in weight percent of PCL blended with PVOH. These samples were mixtures of hydrophilic and hydrophobic polymers blended to create pellets that would dissolve and/or degrade in the presence of water to release the chemical oxidant agent.

Figure 6:
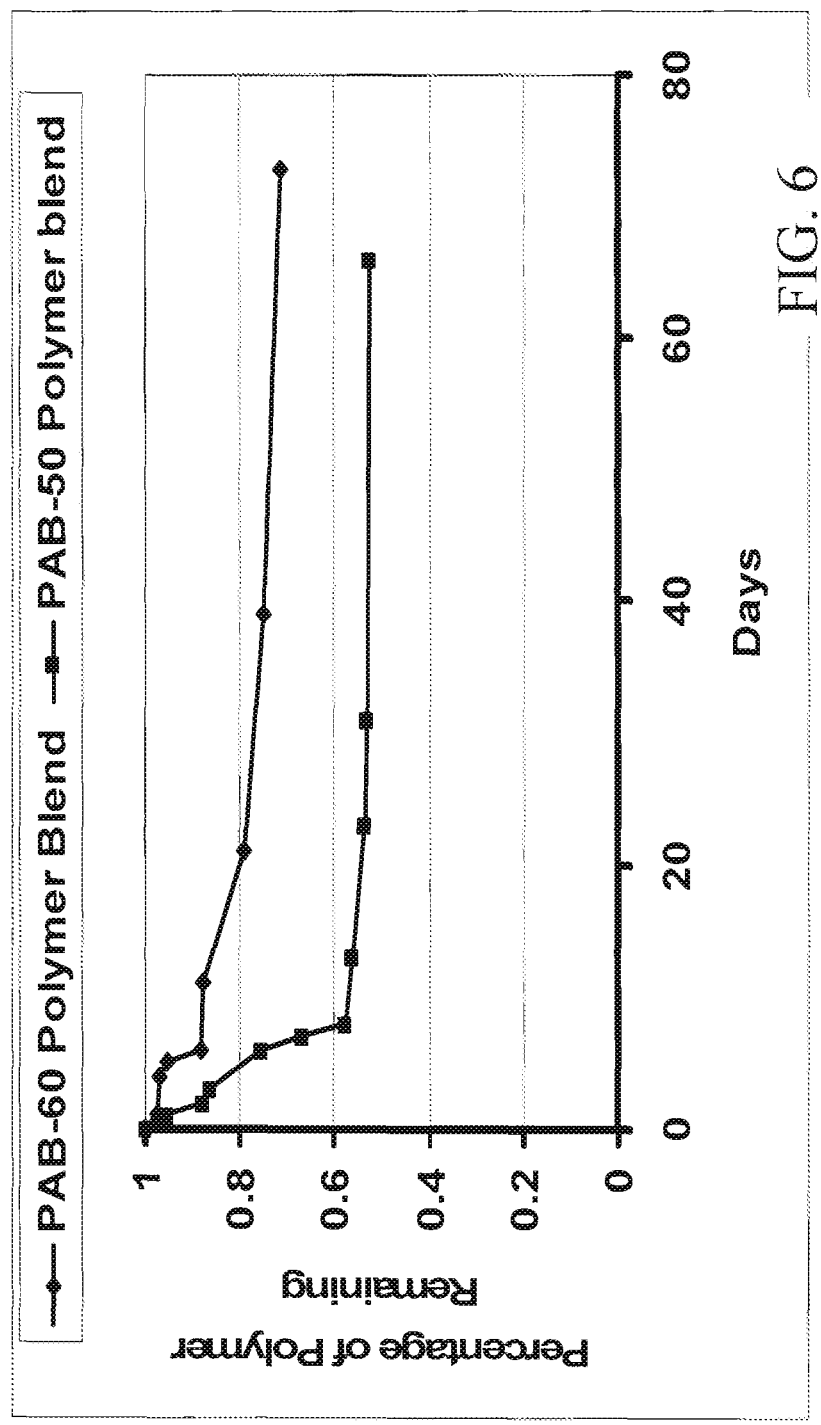
FIG. 6 is a plot comparing degradation of a PAB-50 and a PAB-60 polymer blend for pellet design.

Water evaluated included water collected from Reedy Fork Ranch Creek (Greensboro, N.C.), culture water containing 12 aerobic microorganisms from the PolyTox cultures (Fisher Scientific Company, Fair Lawn, N.J.), and deionized water over a period of six months. These tests were conducted to determine dissolution and degradation of the pellet blends in aqueous media. The FIG. 6 summarizes data from an experiment over a 70 day period using the hydrophilic polymer (in this case PVOH) blended in with the polycarprolactone in samples PAB-50 and PAB-60.

The PAB-50 controlled release remediation composition had an increased dissolution rate in aqueous media compared to PAB-60. This result provided data for designing controlled release remediation compositions to release the chemical oxidant agent at slower or faster rates. That is blends with higher concentrations of the hydrophilic polymer (i.e., PAB-50) dissolve to yield a rapid release of oxidant. Slower, controlled release rates are therefore feasible in polymer blends with less hydrophilic polymer blended in the matrix (i.e., PAB-60).

Dissolution and Degradation experiments of Polymer blends over a 90 day period were designed to investigate dissolution and degradation of the polymer in natural water such as river water and aqueous, aerobic mixed culture. In the lab, the polymers were evaluated in a batch system with 100 ml of river water or culture water. The table below represents the experiment carried out in the lab over a period of 118 days to show how two different polymer blends (PAB-60 and PAB-100) blends dissolved or degraded in aqueous media (Table 1).

Figure 10:
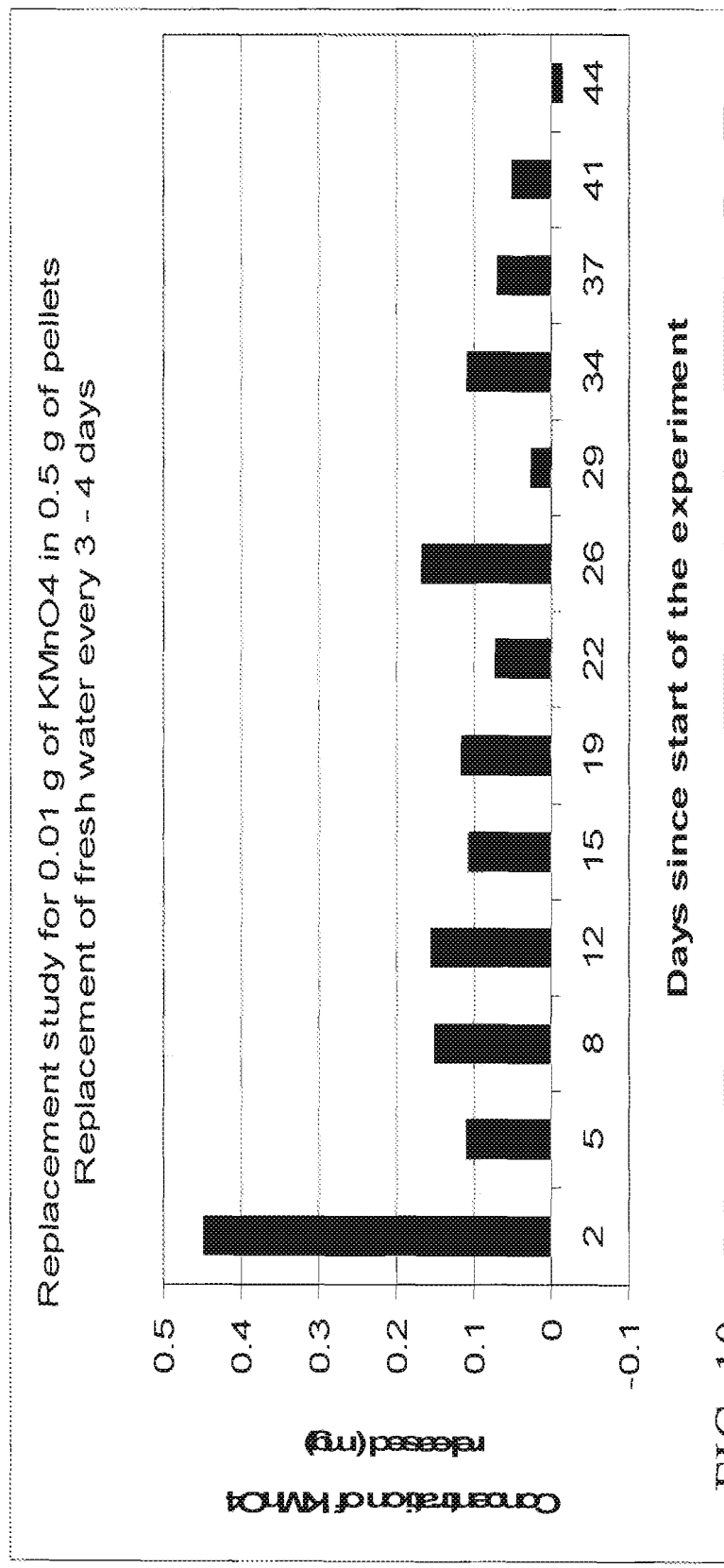
FIG. 10 is a plot showing the time release of a chemical oxidant agent.
Figure 11:
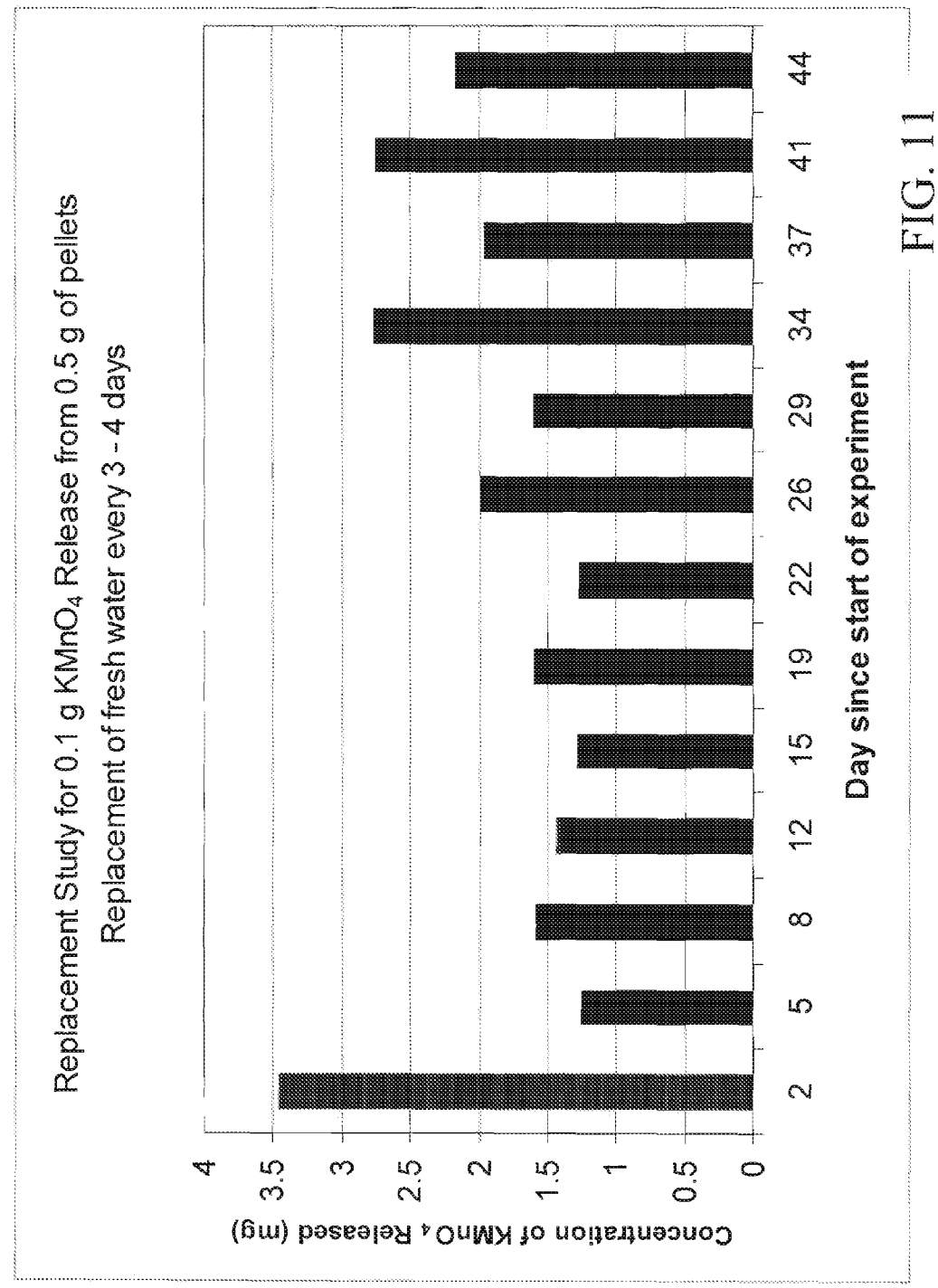
FIG. 11 is a plot showing the time release of a chemical oxidant agent.

FIG. 10 relates to a replacement media study of 0.5 g pellets containing 0.01 g of oxidant. Also, FIG. 11 relates to a replacement media study of 0.5 g pellets containing 0.1 g of oxidant. The oxidant concentration was measured every 2-4 days. After each measurement, the pellets and bottles were rinsed to remove residual oxidant and fresh water added to the reaction bottles. The process of measuring the oxidant concentration was then repeated 2-3 days later.

Figure 12:
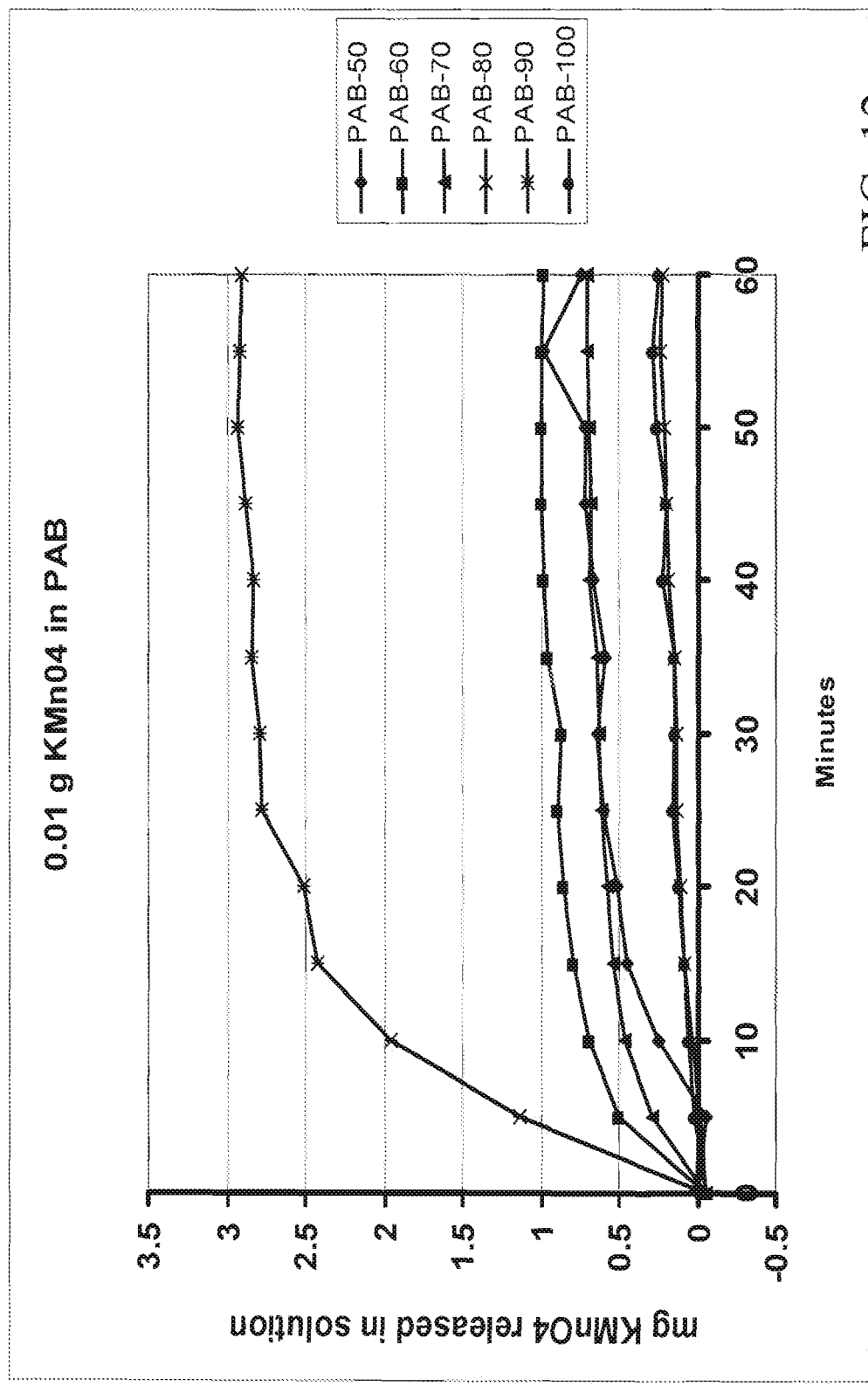
FIG. 12 is a plot comparing the short-term time release of a chemical oxidant agent using different polymers.
Figure 13:
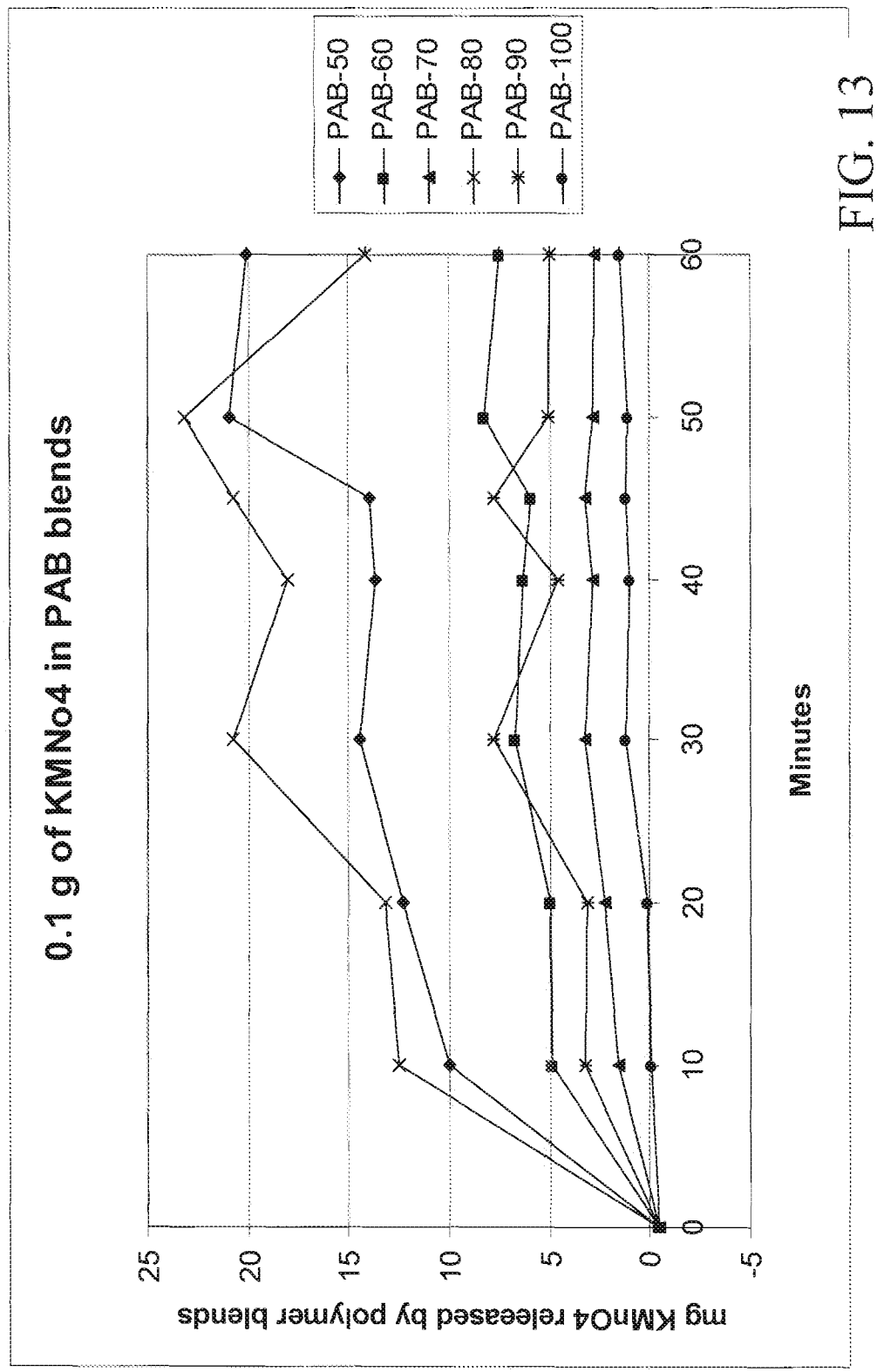
FIG. 13 is a plot comparing the short-term time release of a chemical oxidant agent using different polymers.
Figure 14:
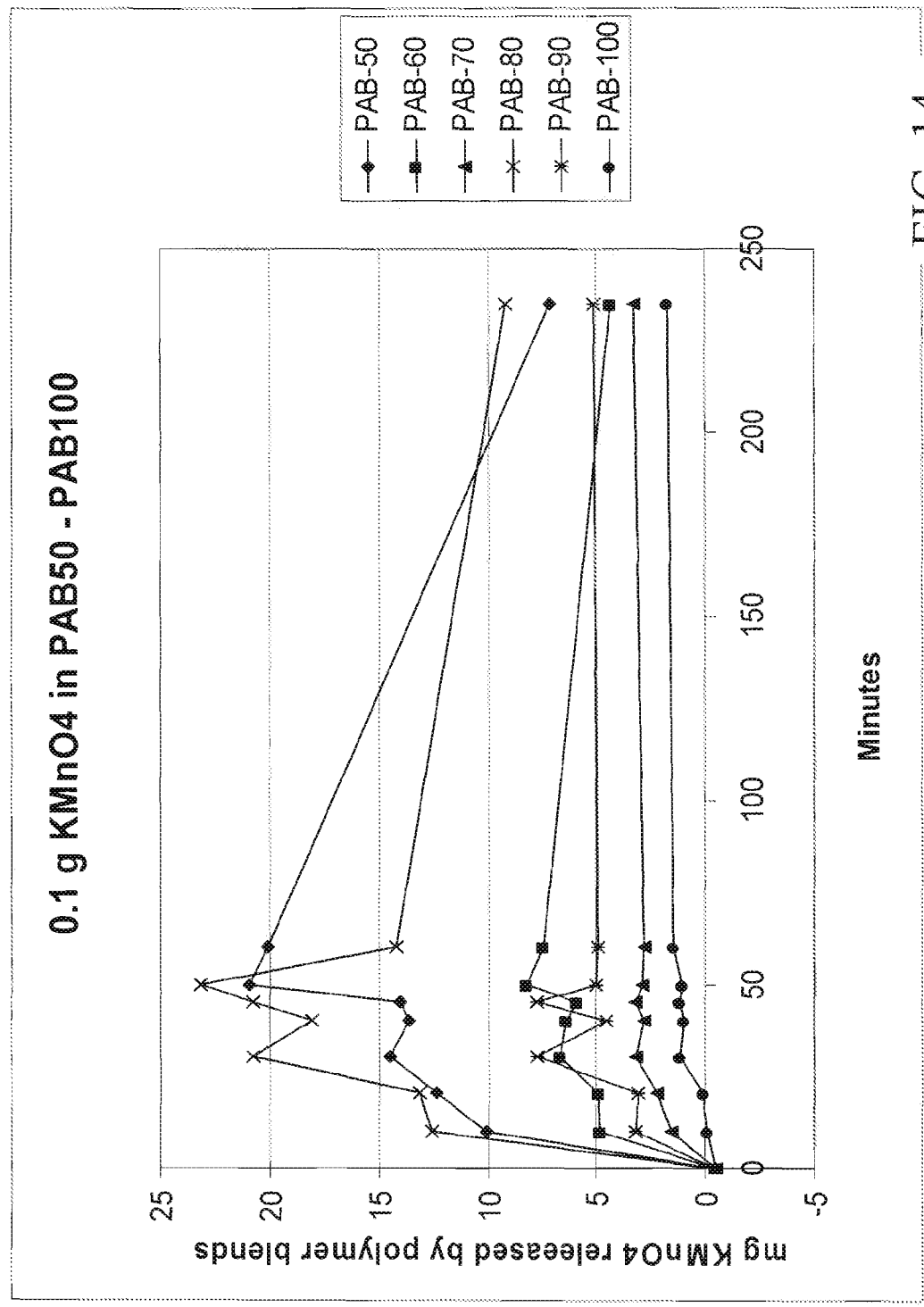
FIG. 14 is a plot comparing the short-term time release of a chemical oxidant agent using different polymers.

FIG. 12 relates to a one-hour release study of 0.5 g pellets containing 0.01 g of oxidant in the polymer and polymer blends PAB-50, PAB-60, PAB-70, PAB-80, PAB-90, and PAB-100. FIG. 13 relates to a one-hour release study of 0.5 g pellets containing 0.1 g of oxidant in the polymer and polymer blends PAB-50, PAB-60, PAB-70, PAB-80, PAB-90, and PAB-100. FIG. 14 relates to a four-hour release study of 0.5 g pellets containing 0.1 g of oxidant in the polymer and polymer blends PAB-50, PAB-60, PAB-70, PAB-80, PAB-90, and PAB-100.

Figure 15:
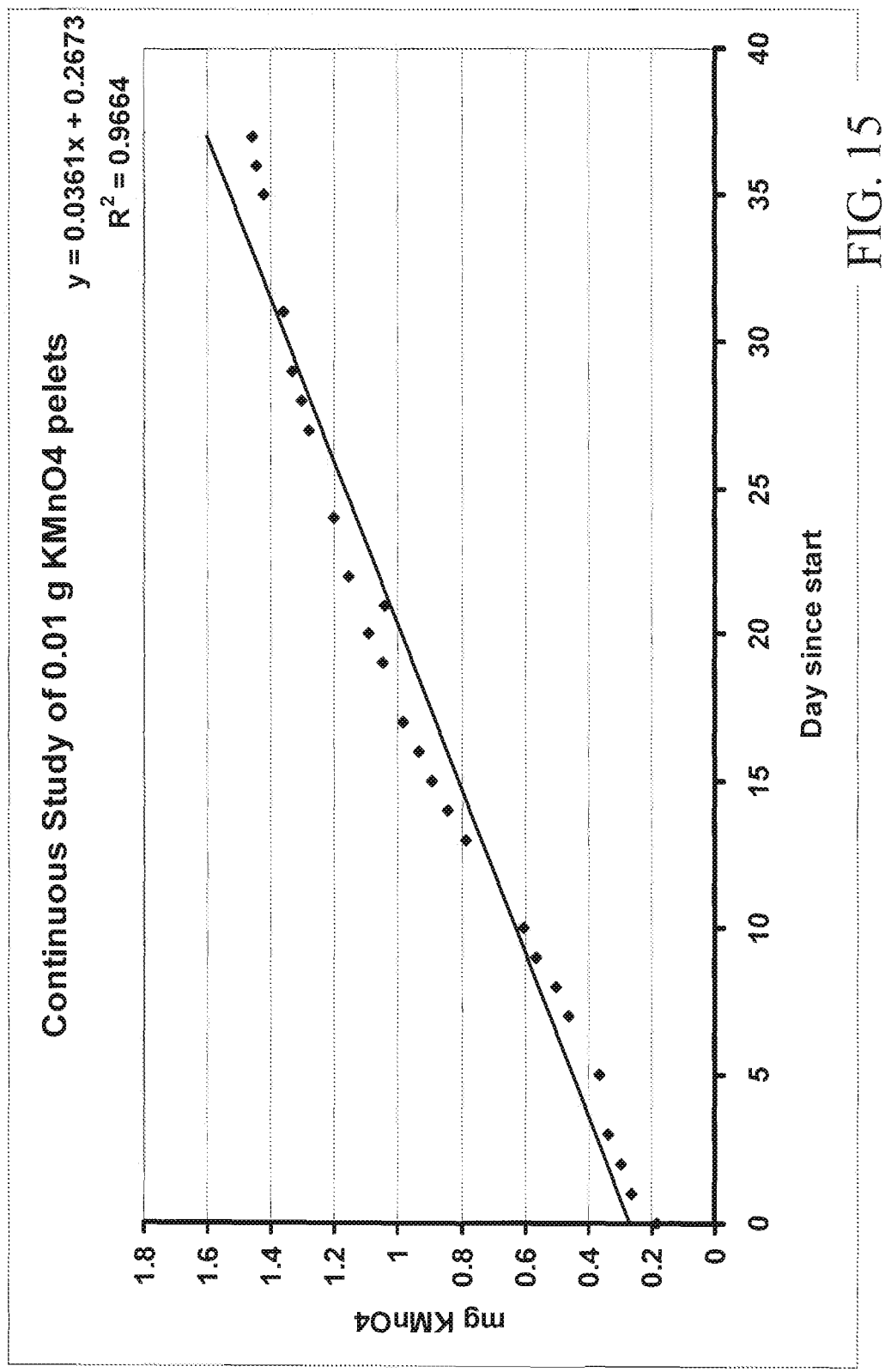
FIG. 15 is a plot showing the release rate of a chemical oxidant agent for a controlled release remediation composition.
Figure 16:
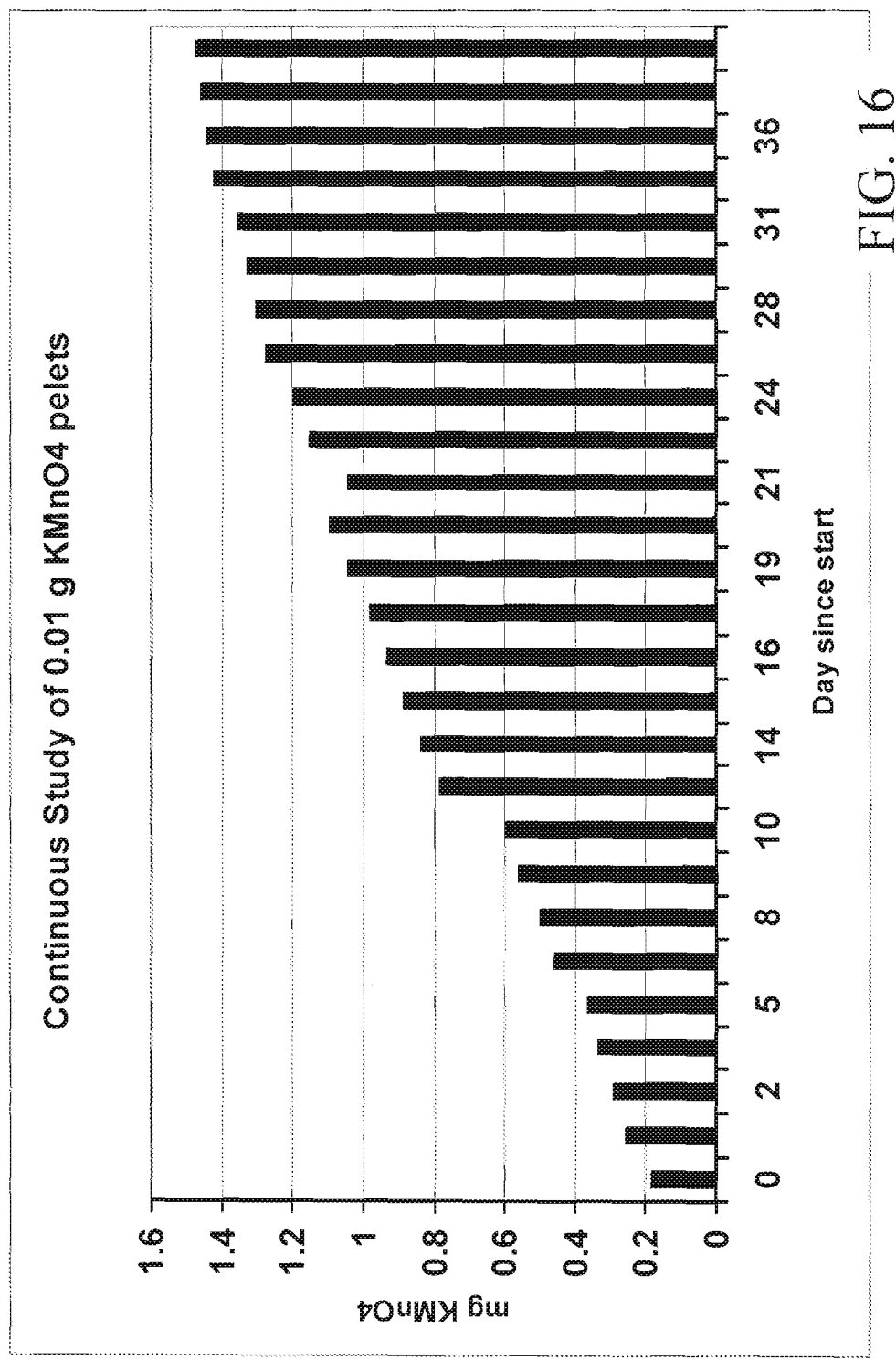
FIG. 16 is a plot showing the release rate of a chemical oxidant agent for a controlled release remediation composition.

FIG. 15 is a linear-fit for release data from 0.5 g pellets containing 0.01 g oxidant to determine the release rate. FIG. 16 is a bar chart presenting continuous release concentration measurements of oxidant release from 0.5 g pellets containing 0.01 g of oxidant.

Figure 17:
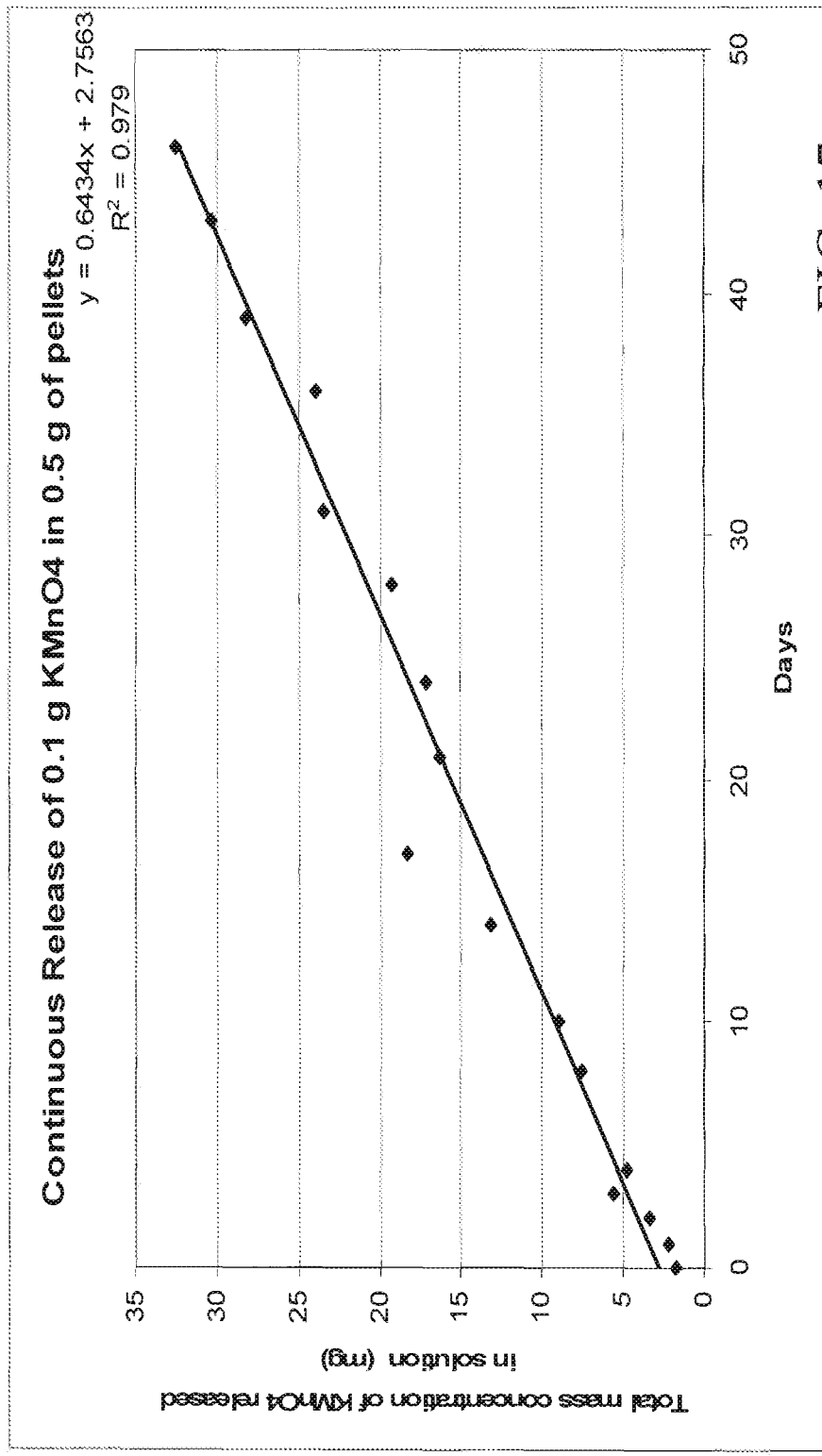
FIG. 17 is a plot showing the release rate of a chemical oxidant agent for a controlled release remediation composition.
Figure 18:
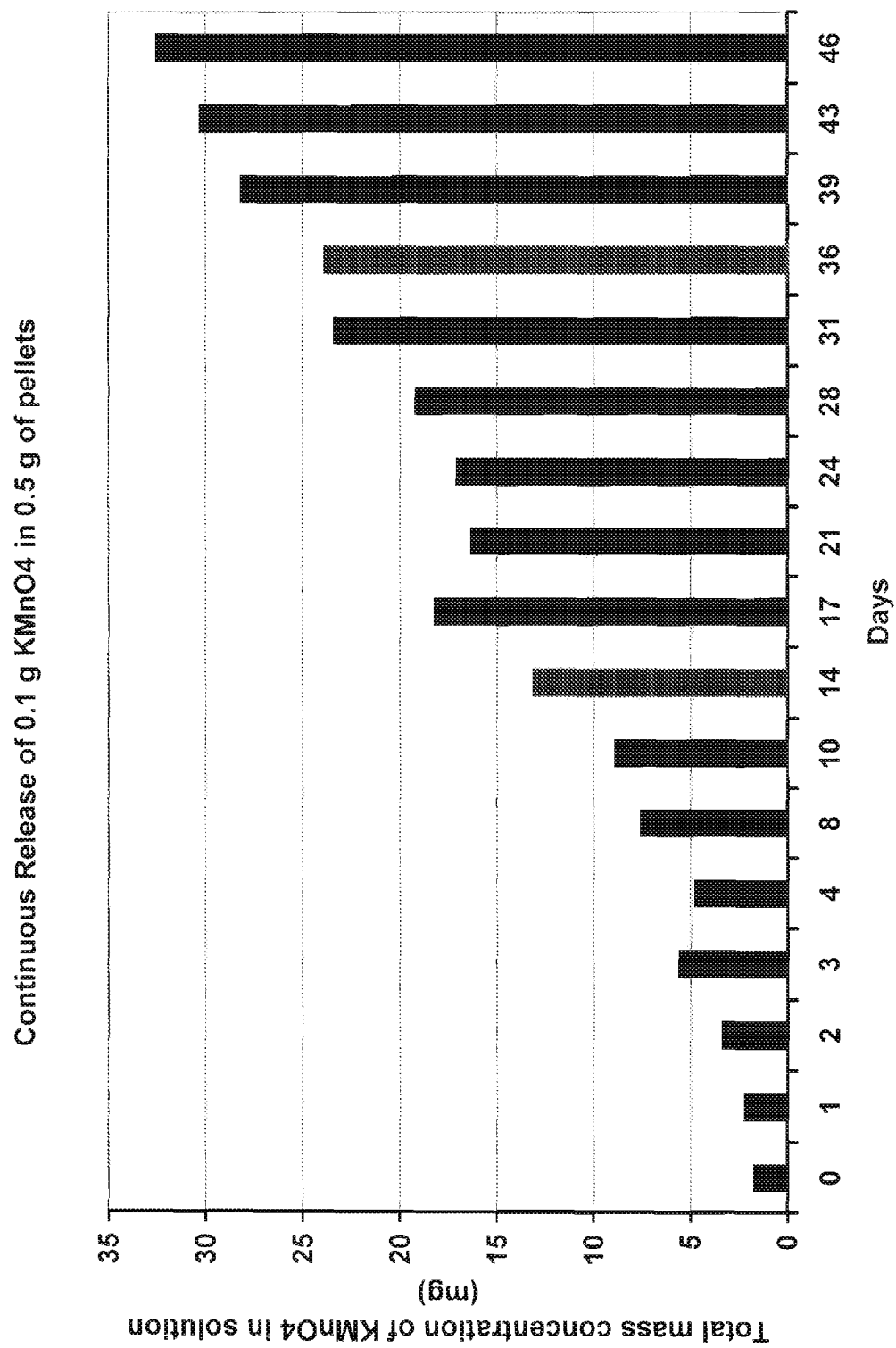
FIG. 18 is a plot showing the release rate of a chemical oxidant agent for a controlled release remediation composition.

FIG. 17 is a linear-fit for release data from 0.5 g pellets containing 0.1 g of oxidant to determine the release rate. FIG. 18 is a bar chart presenting continuous release concentration measurements of oxidant release from 0.5 g pellets containing 0.1 g of oxidant

TABLE 1

| SAMPLES | Dissolution and degradation - Days of Degradation | | | | | | | | | |
|---|---|---|---|---|---|---|---|---|---|---|
| | 0 | 2 | 7 | 13 | 22 | 41 | 55 | 83 | 90 | 118 |
| | Percent Reduction in Mass | | | | | | | | | |
| DI Water (PAB-100)* | | | | | | | | | | |
| River Water (PAB-100) | 0 | 0.4 | 1.3 | 1.6 | 1.8 | 2.1 | 2.2 | 2.3 | 2.5 | 5.7 |
| Mixed Culture (PAB-100) | 0 | 0 | 0 | 3.2 | 3.5 | 5.2 | 6.3 | 8.0 | 8.5 | 11.7 |
| DI water (non-sterile) (PAB-60) | 0 | 0.3 | 6.5 | 7.5 | 18.0 | 30.5 | 33.1 | 33.6 | 33.7 | 35.0 |
| River Water (PAB-60) | 0 | 0.2 | 5.6 | 6.5 | 15.2 | 31.7 | 32.8 | 33.4 | 34.7 | 33.5 |
| Mixed Culture (PAB-60) | 0 | 1 | 6.0 | 8.1 | 14.2 | 31.2 | 33.8 | 35.1 | 35.3 | 37.5 |

*data not available at time of filing

Figure 7:
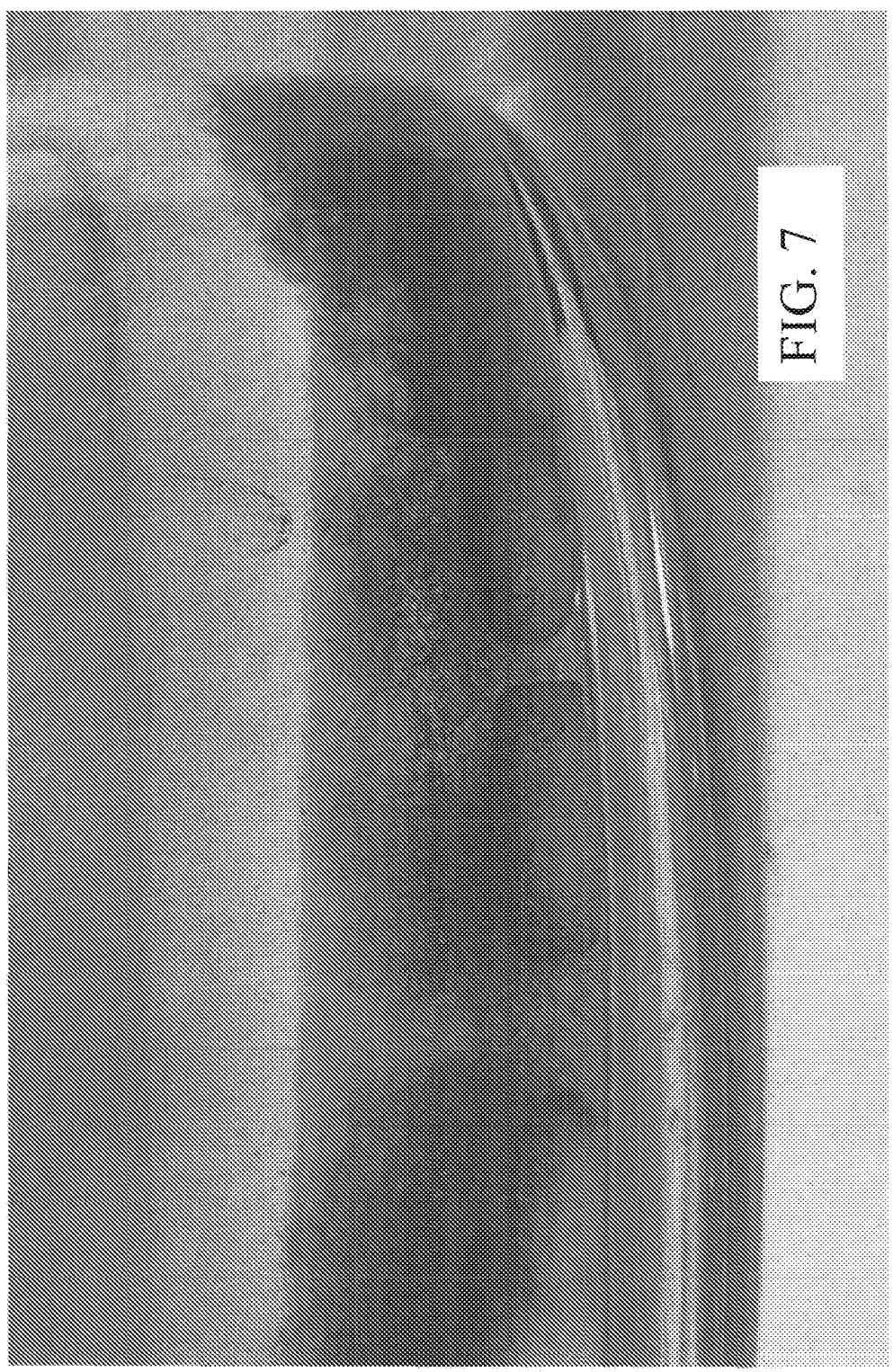
FIG. 7 is a photograph showing visible attachment of plant material growing on pellets after about six months.
Figure 8:
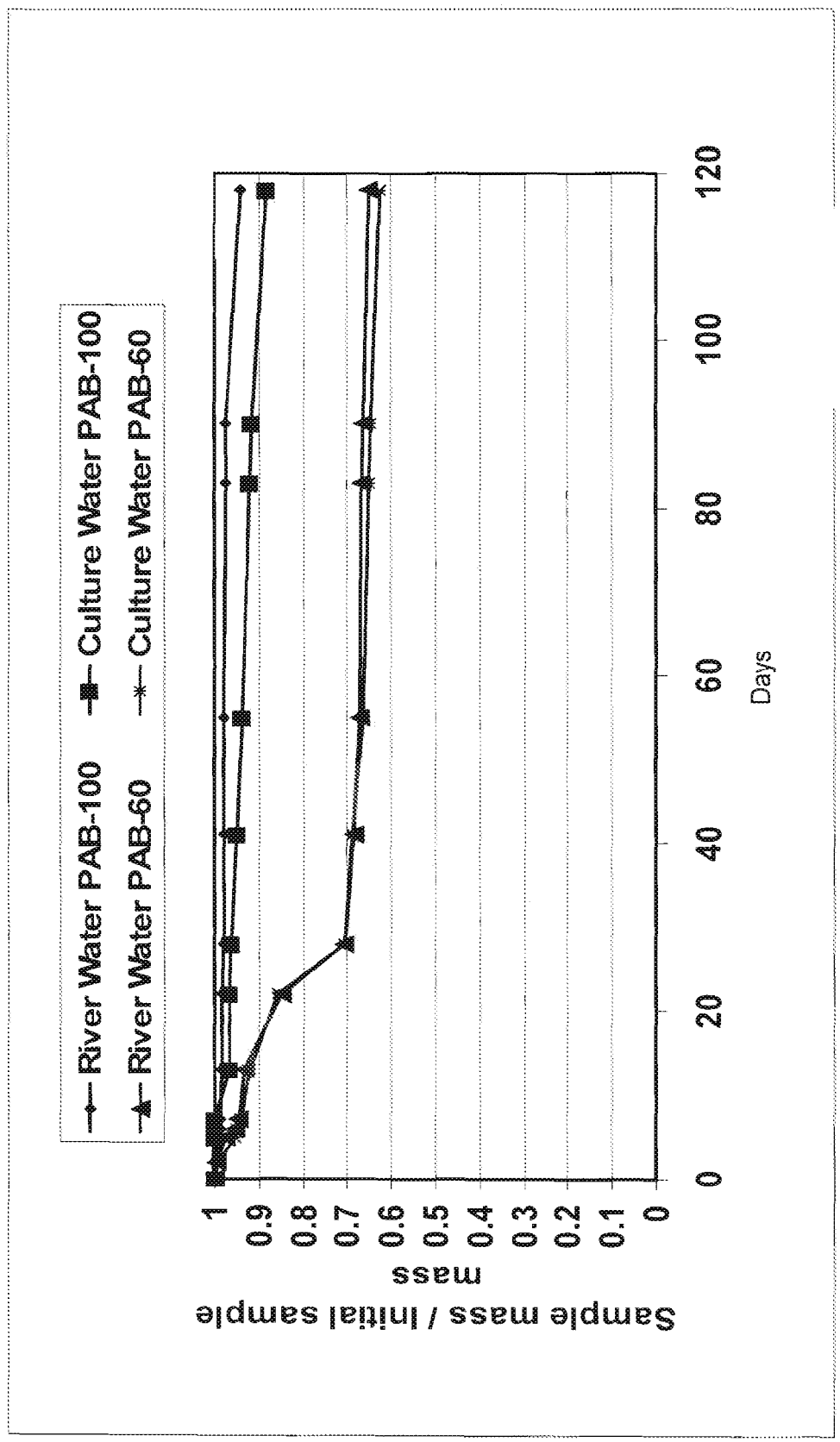

Biological growth was seen on the PAB-100 pellets after about six-months in the batch water (See e.g., FIG. 7). No biological growth was evident on the PAB-60 samples. The pH for the batches, both PAB-60 and PAB-100, ranged from about 6.7-7.5 suggesting the pH level was not the cause for the lack of biological growth in the bottles. Perhaps the lack of growth was due to the addition of the second polymer in the pellet. FIG. 8 includes the results of a study of polymer and polymer blends PAB-100 and PAB-60 normalized to show degradation over 2-months in river water and mixed microbial culture water.

Figure 9C:
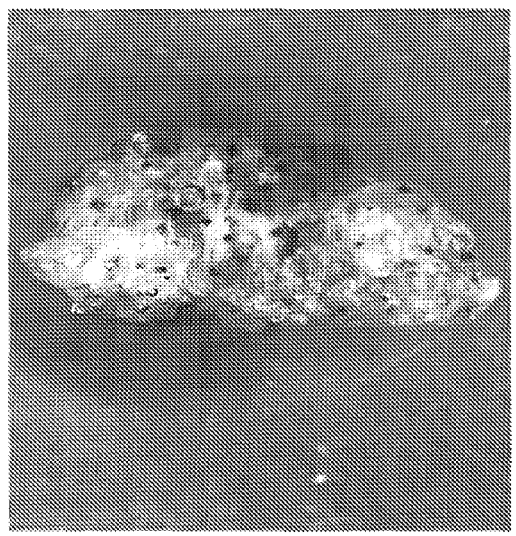
FIGS. 9a, 9b, and 9c are time series photographs of a chemical oxidant agent diffusing from a controlled release remediation composition.
Figure 9B:
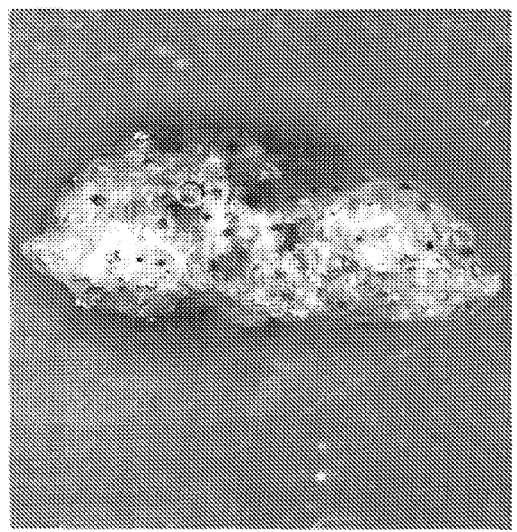
Figure 9A:

The profile in FIGS. 9a, 9b and 9c shows a controlled release remediation composition and a chemical oxidant agent diffusing therefrom. The chemical oxidant agent is embedded in a polymer matrix; this also shows the slow release of the oxidant from pellets of controlled release remediation composition over time, the purple color residue coming out of the matrix is the chemical oxidant agent, potassium permanganate.

Biphasic $KMnO_4$ release was observed in our $KMnO_4$ release studies. A rapid release of $KMnO_4$ occurred during the initial about 1-3 days followed by a controlled and slower release of KMnO4 for an extended period of time. (See e.g., FIGS. 10 & 11).

Controlled release remediation compositions based on the polymer blends were made. Chemical oxidant agent release was delayed by increasing the amount of PCL in the polymer blends. PAB-50, PAB-60 and PAB-70 contained 50%, 60% and 70% PCL in the polymer blend respectively. These polymers released $KMnO_4$ faster than PAB-80 and PAB-100. It was also observed that homogenous mixing of the polymers for the blends was beneficial. PVOH is hydrophilic and will readily dissolve in water leaving pores in the hydrophobic PCL matrix. When PVOH is not homogeneously mixed in the interior of the matrix and PVOH crystals are located on the surface of the pellet, $KMnO_4$ will be released in to the water at a faster rate. This was observed in PAB-90 which demonstrated a significantly higher release rate for the oxidants.

Controlled release remediation composition PAB-50 which is a 50/50 and controlled release remediation composition PAB-60 which is as a 60/40 mix of two polymers released $KMnO_4$ at a faster rate than PAB-80 and PAB-100. Controlled release remediation composition PAB-90 exhibited a higher than expected release rate for $KMnO_4$ compared to the other samples. Applicant believes that the polymer blend was not homogenously distributed throughout the pellet. Either more dissolution polymer was present at the surface of the pellet or surface imbedded KMnO4 was present on the surface of the pellet and caused a rapid release of the oxidant.

Examples Including Persulfate

Oxone® monopersulfate compound (E. I. du Pont de Nemours and Company, Wilmington, Del.) was used as the oxidant encapsulated in an environmentally degradable polymer, a biodegradable polymer, an environmentally degradable polymer and biodegradable polymer, a copolymer thereof, or a blend thereof. Polycaprolactone (Dow Chemical, Midland Mich.) was evaluated.

The active ingredient of the Oxone® compound is potassium peroxymonosulfate, $KHSO_5$ [CAS-RN 10058-23-8], commonly known as potassium monopersulfate, which is present as a component of a triple salt with the formula $2KHSO_5 \cdot KHSO_4 \cdot K_2SO_4$ [potassium hydrogen peroxymonosulfate sulfate (5:3:2:2), [CAS-RN 70693-62-8]. The oxidation potential of the Oxone® compound is derived from its peracid chemistry; it is the first neutralization salt of peroxymonosulfuric acid $H_2SO_5$ (also known as Caro's acid). The Oxone® compound has an oxidation potential of −1.44 V and is considered a strong oxidant. The physical properties and typical analyses of Oxone® are shown in Table 2 below.

TABLE 2

Oxone ® Compound Physical Properties and Typical Analysis

| Molecular Weight (triple salt) | | 614.7 |
|---|---|---|
| Active Oxygen | % min. | 4.5 |
| | % average analysis | 4.7 |
| | % theoretical (triple salt) | 5.2 |
| Active Component | % $KHSO_5$, min. | 42.8 |
| Bulk Density | g/cm³ (Mg/m³) | 1.15-1.30 |
| | lb/ft³ | 72-81 |
| Particle Size | through USS Sieve #20, % | 100 |
| | through US Sieve #200, % min. (also see Table II) | 10 |
| pH | at 25° C. (77° F.) | |
| | 1% solution | 2.3 |
| | 3% solution | 2.0 |
| Solubility | g/L, $H_2O$, 20° C. (68° F.) (also see Table III) | 256 |
| Moisture Content | % max. | 0.1 |
| Stability | % active oxygen loss/month | <1 |
| Standard Electrode Potential (E°) | V | −1.44 |
| Heat of Decomposition | kJ/kg | 251 |
| | Btu/lb | 108 |
| Thermal Conductivity | W/m · K | 0.161 |
| | Btu · ft/h · ft² · F. | 0.093 |

The typical particle size analysis of Oxone® is shown in Table II. Particle size may be adjusted by screening, grinding, or compaction/granulation processes.

TABLE 3

Typical Particle Size Analysis of Oxone ® Compound

| U.S. Sieve Size | Sieve Opening, μm | Approx. Composition, wt % (On Screen, Cumulative) |
|---|---|---|
| 30 | 600 | 1 |
| 70 | 212 | 68 |
| 100 | 150 | 84 |
| 200 | 75 | 98 |
| 325 | 45 | 100 |

Potassium peroxymonosulfate is capable of oxidizing alkenes, aldehydes, ketones, sulfoxides, sulfides, thiols, disulfides, and phenols. Also, potassium peroxymonosulfate is capable of decomposing organic matter, pool/spa bather waste, and/or pesticides. Further, potassium peroxymonosulfate is capable of inactivating pathogenic microorganisms identified as biological pathogens or terrorist biological pathogens such as *E. coli, Bacillus atrophaeus, Bacillus thuringiensis*, and *Aspergillus niger* (i.e., anthrax, plague, . . . etc.).

Figure 19:
FIG. 19 is a photo of the Oxone® compound in a polycaprolactone (PCL) polymer photographed after it was made into a controlled release remediation composition.

To produce controlled release remediation compositions, Oxone® compound and polycaprolactone (PCL) polymer (Dow Chemical, Midland Mich.) were combined to produce about 0.3 to about 0.5 cm solid pellets. Molten polymer was created by heating the polymer above its melting point in an aluminum dish or Pyrex® beaker using a hot plate stirrer. The Oxone® compound was then stirred into the molten polymer to suspend the Oxone® compound. Pellets were then formed by placing the viscous molten suspension in a mold to solidify and form the pellets. FIG. 19 is photo of the Oxone® compound imbedded in polycaprolactone (PCL) polymer as a controlled release remediation composition.

Figure 20:
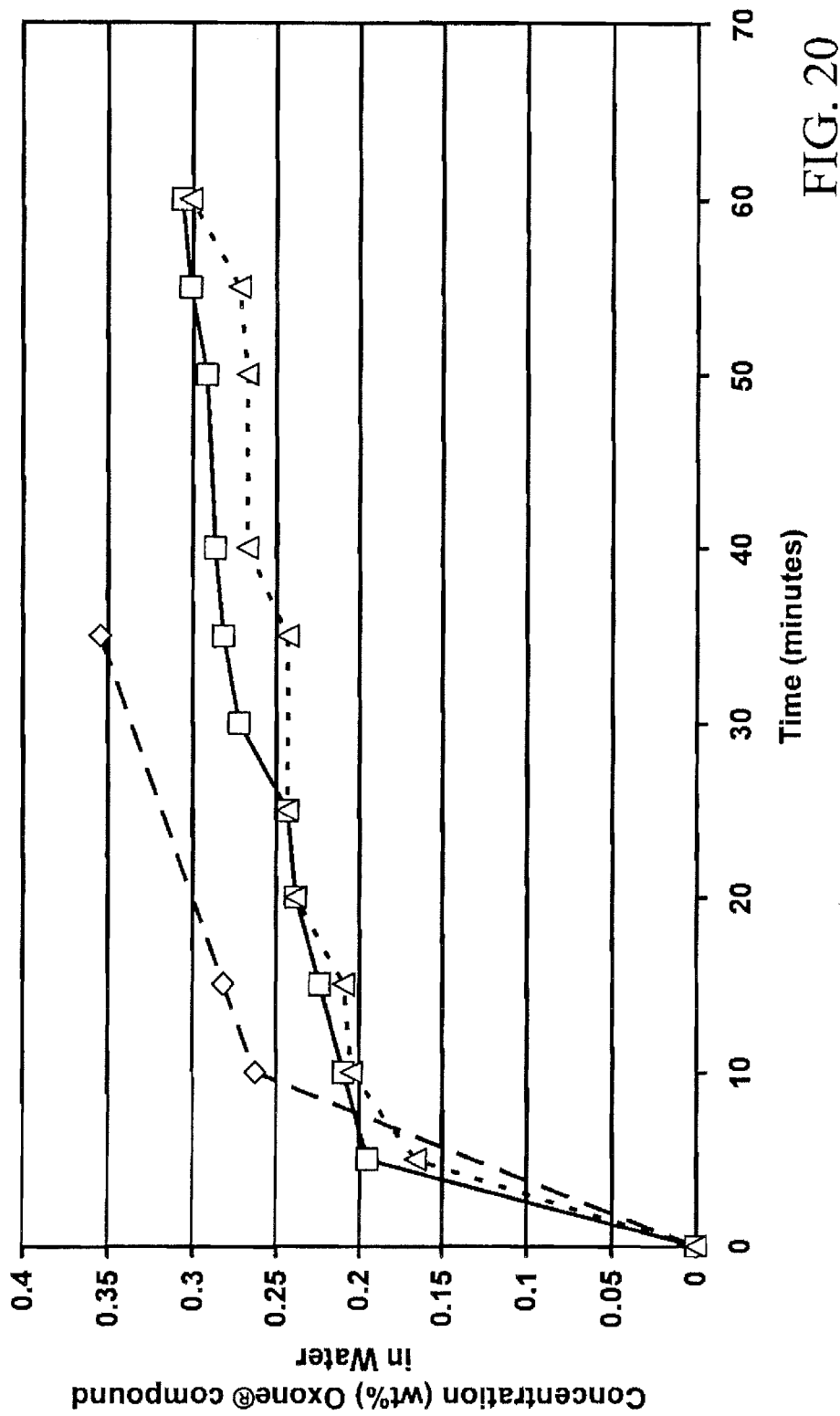
FIG. 20 is a plot showing the release rate of a chemical oxidant agent for a controlled release remediation composition including the Oxone® compound.
Figure 21:
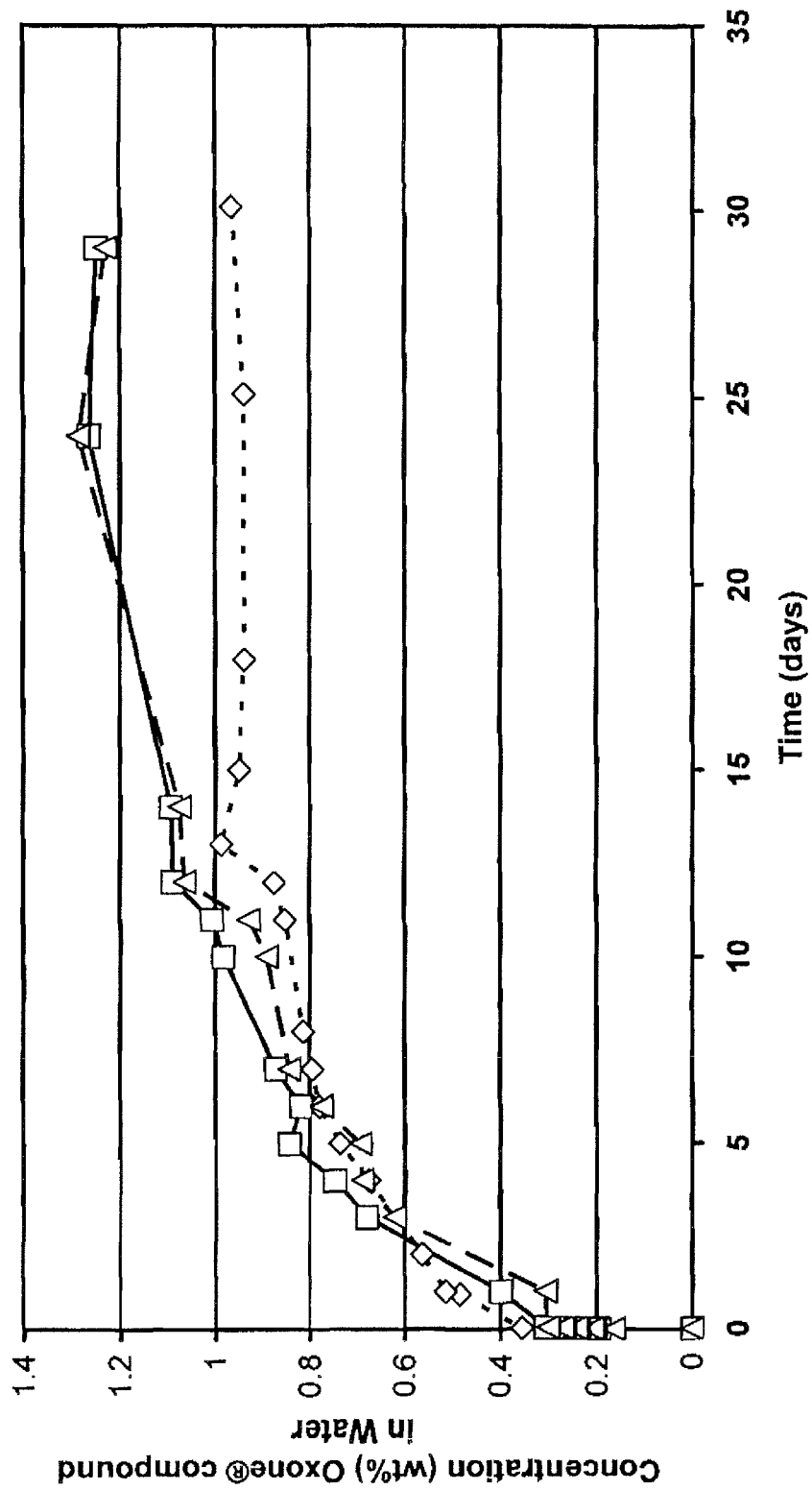
FIG. 21 is a plot showing the release rate of a chemical oxidant agent for a controlled release remediation composition including the Oxone® compound.
Figure 22:
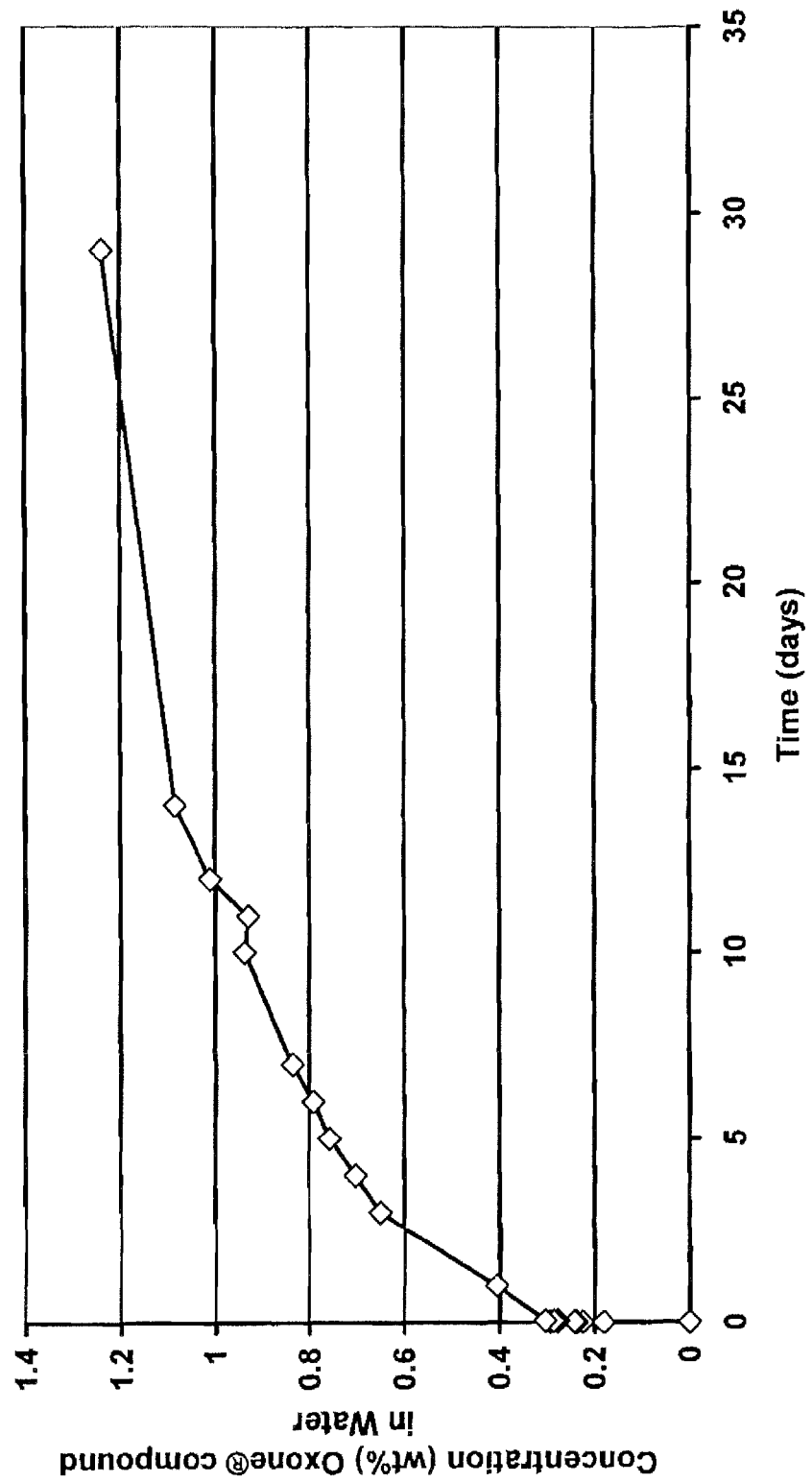
FIG. 22 is a plot showing the average release rate of a chemical oxidant agent for a controlled release remediation composition including the Oxone® compound for the data of FIG. 21.

FIG. 20 relates to one-hour release studies of 0.5 g pellets containing 0.3 g of the Oxone® compound embedded in the polycaprolactone (PCL) polymer. FIG. 21 relates to thirty-day release studies of 0.5 g pellets containing 0.3 g of the Oxone® compound in the polycaprolactone (PCL) polymer. FIG. 22 relates to FIG. 21 and is an average of the thirty-day release studies of the 0.5 g pellets containing 0.3 g of the Oxone® compound in the polycaprolactone (PCL) polymer. The weight % (wt %) of the Oxone® compound concentration in water was determined by measuring the absorbency of the solution using a Shimadzu UV-1700 Spectrophotometer (Shimadzu Scientific Instruments, Columbia, Md., USA). A calibration curve using known amounts at concentrations from 0 to 5 wt % Oxone® compound in solution was developed using a wavelength of 254 nm. Each concentration of the Oxone® compound in solution exhibits a different absorbency at 254 nm that corresponds to the amount of the Oxone® compound present in solution. Using the Spectrophotometer to measure the absorbency for the water sample at different time points, the concentration of the Oxone® compound in solution could be determined by correlating the absorbency level with the corresponding absorbency on the calibration curve.

These pellets were used to evaluate the removal of *Escherichia coli* (commonly *E. coli*) from publicly accessible water. Water samples were collected from Country Park Lake (3905 Nathanael Green Drive, Greensboro, N.C.) an area frequented by a large population of Canada geese. Recreational use of the publicly accessible water in this area is restricted due to high *E. coli* concentrations that can lead to illness. Using the Membrane Filter Count Method, the samples were analyzed to determine the concentration of *E. coli* in the publicly accessible water and to determine the effect of the Oxone® compound and 0.5 g pellets containing 0.3 g of the Oxone® compound embedded in the polycaprolactone (PCL) polymer would have on *E. coli* reduction.

Water samples including control water samples and publicly accessible water samples (from Country Park Lake) at concentrations of 1 ml, 0.1 ml, 0.01 ml, and 0.001 ml were prepared for evaluation. These water samples were exposed to concentrations of 0.1 g of the Oxone® compound, 0.3 g of the Oxone® compound, and 0.5 g pellets containing 0.3 g of the Oxone® compound embedded in the polycaprolactone (PCL) polymer.

The water samples were filtered through 5 μm filters and bacteria was cultured in petri dishes with m-Endo broth (e.g., commercially available form BD Diagnostic Systems Sparks, Md.) for 24-hours at 35° C. If *E. coli* was present in the filtered water sample, metallic purple/red *E. coli* colonies would grow on the filter in the petri dish. For this analysis, the larger the water sample filtered, the higher the concentration of *E. coli* which would grow within the 24-hour window. To analyze the amount of *E. coli* on the filter, the goal was to determine the appropriate water dilution amount to obtain filters where the number of colonies could be counted. If the filter was covered with *E. coli*, the petri dish was classified as "To numerous to count". When an acceptable number of countable colonies was obtained, the number of colonies/100 ml was calculated for the water sample. Water samples were also treated with Oxone® compound crystals or Oxone® compound embedded in the polycaprolactone (PCL) polymer to determine the number of colonies which would grow in 24-hours under the same conditions.

The 1 ml and 0.1 ml concentrations were "to numerous to count" for the controls however the diluted 0.01 ml and 0.001 ml samples provided a representative sample that could be counted. Oxone® compound treated water demonstrated complete removal of *E. coli* such that no bacteria growth was detected.

TABLE 4

*E. coli* Colony Counts

|  | 0.01 ml dilution Plates | 0.001 ml dilution Plates | Average 24 hours # colonies/ 100 ml |
|---|---|---|---|
| Control - Sample using | $3.3 \times 10^5$ colonies/ 100 ml | $3.6 \times 10^5$ colonies/ 100 ml | $3.45 \times 10^5$ colonies/ 100 ml |

|  | 1 ml dilution plates | 0.1 ml dilution plates | Average 24 hours # colonies/ 100 ml |
|---|---|---|---|
| Oxone ® compound Crystal Only - 0.1 g After 15 minute treatment | No colonies detected | No colonies detected | No colonies detected |
| Oxone ® compound Crystal Only - 0.3 g After 15 minute treatment | No colonies detected | No colonies detected | No colonies detected |
| Pellets with 0.3 g Oxone ® compound embedded After 15 minute treatment | No colonies detected | No colonies detected | No colonies detected |

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention. By way of example, one or more controlled release remediation compositions of the present invention may be used to provide extended treatment to any one of lake water(s), sediment(s) in a lake or lakes, or both; river water(s), sediment(s) in a river or rivers, or both; stream water(s), sediment(s) in a stream or streams, or both; or combinations thereof. By way of an additional example, one or more controlled release remediation compositions of the present invention may be used to provide extended treatment to at least a portion of a water supply network (e.g., drainage basin {also known as catchment, catchment area, catchment basin, drainage area, river basin, water basin, or watershed}, raw water reservoir {e.g., lake(s), river(s), and/or aquifer(s)}, delivery systems {e.g., piping, uncovered ground level aqueducts and/or tunnels}, water purification components, transmission components {e.g., pipes and treated water storage whether superterranean, terranean, and/or subterranean}, and distribution systems {e.g., piping/water-mains from transmission components to consumption points}). Additionally, one or more controlled release remediation compositions of the present invention may be used to treat impaired waters from:

agricultural waste (e.g., pesticides, animal waste {e.g. animal waste lagoons such as bovine animals, swine, sheep, goats, horses, asses, mules or hinnies, . . . etc.}, biosolids {e.g., before land application, . . . etc.}, accidental contamination (e.g., from hurricanes, tornadoes, floods, spills {e.g., chemical and/or biological}, animal contamination (e.g., waste from wild and/or domesticate animal populations such as water fowl, bovine animals, swine, sheep, goats, horses, asses, mules or hinnies, . . . etc. that may result in fecal coliform.), intentional contamination (e.g., terrorist and/or biological warfare agents {e.g., bacterial spores, fungal spores, vegetative bacterial cells, viruses . . . etc.} might be inactivated while environmental chemicals might be remediated . . . etc.

Further, one or more controlled release remediation compositions of the present invention might include one of more catalysts and/or one of more buffer chemicals. For example, catalysts (e.g., cobalt, sodium chloride {NaCl—in brine or sea water—can lead to the production of hypochlorite [bleach]}, acetone, . . . etc. added to peroxymonosulfate) might be added to amplify oxidation capabilities of a chemical oxidant agent. Also for example, buffering chemicals might be used with aspects of embodiment of the present invention to help maintain natural pH levels in environmental systems. It should be understood that all such modifications and improvements have been deleted herein for the sake of conciseness and readability but are properly within the scope of the following claims.

The invention claimed is:

1. A controlled release remediation composition comprising:
    A) at least one chemical oxidant agent, wherein the at least one chemical oxidant agent is capable of remediating at least one chemical pollutant; and
    B) a matrix polymer, wherein:
        i) at least a portion of the matrix polymer embeds at least a portion of the chemical oxidant agent, and
        ii) at least a portion of the matrix polymer comprises polycaprolactone;
    wherein the controlled release remediation composition is in the form of a pellet; and
    wherein the controlled release remediation composition is capable of releasing an amount of the at least one chemical oxidant agent over at least about a one month period into groundwater or soil in-situ.

2. The controlled release remediation composition according to claim 1:
    wherein A) comprises at least two chemical oxidant agents capable of remediating at least two different chemical pollutants; and
    wherein the controlled release remediation composition is capable of releasing amounts of the at least two chemical oxidant agents over at least a one month period.

3. The controlled release remediation composition according to claim 1, wherein the pellet has one or more dimensions of more than about a micron (μm).

4. The controlled release remediation composition according to claim 1, wherein the pellet has a largest dimension of about 1 millimeter.

5. The controlled release remediation composition according to claim 1, wherein the pellet is in the shape of a sphere, a cylinder, a wagon wheel, gear-shape, a saddle, a disk, a brick, a coil, a column, a hollow-elbow, a chip, a fiber, or any two or more of the preceding.

6. The controlled release remediation composition according to claim 1, wherein the at least one chemical oxidant agent comprises at least one of an electron transfer reaction agent, a free radical agent, or a combination thereof.

7. The controlled release remediation composition according to claim 1, wherein the at least one chemical oxidant agent comprises at least one of a persulfate agent, a permanganate agent, or a combination thereof.

8. The controlled release remediation composition according to claim 1, wherein the matrix polymer has a degradation rate less than the release rate of the at least one chemical oxidant agent.

9. The controlled release remediation composition according to claim 1, wherein the matrix polymer further comprises at least one of a polylactide, a polyglycolide, a polylactide-co-glycolide, a polylactic acid, polyglycolic acid, polylactic acid-co-glycolic acid, a polycarbonate, a polyesteramide, a polyvinyl ester, a polyanhydride, a polyamino acid, a polyorthoester, polyacetyls, polycyanoacrylates, polyetheresters, a polydioxanone, a polyalkylen alkylate, a copolymer of a polyethylene glycol and a polylactide or polylactide-co-glycolide, a biodegradable polyurethane, a polysaccharide, a blend of any two or more of the preceding, or a copolymer of any two or more of the preceding.

10. The controlled release remediation composition according to claim 1, wherein the matrix polymer comprises a blend comprising:
   a) polyprolactone;
   b) a second polymer; and
   c) optionally a third polymer.

11. The controlled release remediation composition according to claim 1, wherein the matrix polymer further comprises a copolymer.

12. The controlled release remediation composition according to claim 1, wherein the matrix polymer further comprises at least one of a polylactic acid, polyvinyl alcohol, a blend of any two or more of polylactic acid, polyvinyl alcohol or polycaprolactone, or a copolymer of any two or more of polylactic acid, polyvinyl alcohol and polycaprolactone.

13. The controlled release remediation composition according to claim 1, wherein the matrix polymer comprises a blend comprising:
   a polyvinyl alcohol; and
   a polycaprolactone.

14. The controlled release remediation composition according to claim 1, wherein the matrix polymer further comprises a copolymer comprising:
   a) a polycaprolactone;
   b) a polyvinyl alcohol; and
   c) a balance of at least one of a polylactide, a polyglycolide, a polylactide-co-glycolide, a polylactic acid, polyglycolic acid, polylactic acid-co-glycolic acid, a polycarbonate, a polyesteramide, a polyvinyl ester, a polyanhydride, a polyamino acid, a polyorthoester, polyacetyls, polycyanoacrylates, polyetheresters, a polydioxanone, a polyalkylen alkylate, a copolymer of a polyethylene glycol and a polylactide or polylactide-co-glycolide, a biodegradable polyurethane, a polysaccharide, a blend of any two or more of the preceding, or a copolymer of any two or more of the preceding.

15. The controlled release remediation composition according to claim 1, wherein the at least one chemical pollutant comprises at least one of a chlorinated organic compound, a compound containing at least one unsaturated carbon-carbon bond, an aromatic hydrocarbon, a polycyclic aromatic hydrocarbon, a munitions constituent, an organic pesticide, wastewater, a drinking water treatment, a pathogen, or any combination of two or more of the preceding.

16. The controlled release remediation composition according to claim 1, wherein:
   a) the at least one chemical oxidant agent comprises between about 1 wt % to about 60 wt % of the controlled release remediation composition; and
   b) the matrix polymer comprises the balance of the controlled release remediation composition.

17. The controlled release remediation composition according to claim 1, wherein the at least one chemical oxidant agent comprises particles having a diameter of no more than about 125 μm.

18. A method of making the controlled release remediation composition according to claim 1, the method comprising the steps of:
   A) selecting at least one chemical oxidant agent capable of remediating at least one chemical pollutant;
   B) selecting a matrix polymer comprising polycaprolactone; and
   C) combining the chemical oxidant agent and the matrix polymer so that at least a portion of the matrix polymer embeds at least a portion of the chemical oxidant agent.

19. A remediation system comprising:
   a plurality of at least one controlled release remediation composition according to claim 1
   wherein the at least one controlled release remediation composition is capable of releasing a sufficient amount of the at least one chemical oxidant agent into a contaminated site over at least about a one month period so as to remediate at least a portion of the at least one chemical pollutant.

20. A method of using at least one controlled release remediation composition according to claim 1, the method comprising the steps of:
   A) determining at least one chemical pollutant to be remediated at a contaminated site;
   B) selecting at least one chemical oxidant agent capable of remediating the at least one chemical pollutant;
   C) selecting a matrix polymer comprising polycaprolactone;
   D) combining the chemical oxidant agent and the matrix polymer so that at least a portion of the matrix polymer embeds at least a portion of the chemical oxidant agent to form at least one controlled release remediation composition;
   E) shaping, sizing, or shaping and sizing the controlled release remediation composition so as to release an amount of the at least one chemical oxidant agent over at least about a one month period; and
   F) providing a sufficient amount of the shaped, sized, or shaped and sized controlled release remediation composition to the contaminated site in manner that remediates at least a portion of the at least one chemical pollutant at the contaminated site.

21. The controlled release remediation composition according to claim 1, wherein the matrix polymer comprises between about 50 wt % to about 100 wt % of polycaprolactone blended with between 0 wt % to 50 wt % polyvinyl alcohol.

22. The controlled release remediation composition according to claim 1, wherein the controlled release remediation composition is capable of releasing an amount of the at least one chemical oxidant agent over at least about a three month period.

23. The controlled release remediation composition according to claim 15 wherein the at least one chemical pollutant comprises a chlorinated organic compound, a pathogen or a combination thereof.

* * * * *